(12) United States Patent
Tonami et al.

(10) Patent No.: US 7,050,373 B2
(45) Date of Patent: May 23, 2006

(54) METHOD AND APPARATUS FOR REPRODUCING INFORMATION

(75) Inventors: Junichiro Tonami, Yokohama (JP); Takayuki Ohki, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 407 days.

(21) Appl. No.: 10/456,610

(22) Filed: Jun. 9, 2003

(65) Prior Publication Data

US 2003/0231569 A1 Dec. 18, 2003

(30) Foreign Application Priority Data

Jun. 12, 2002 (JP) ............................. 2002-172102

(51) Int. Cl.
*G11B 5/09* (2006.01)
*G11B 7/00* (2006.01)
*G11B 7/24* (2006.01)

(52) U.S. Cl. ............................. 369/47.48; 369/47.15; 369/47.28; 369/59.19; 369/275.1

(58) Field of Classification Search ..................... None
See application file for complete search history.

(56) References Cited

U.S. PATENT DOCUMENTS 6,687,198 B1 * 2/2004 Yamawaki ............... 369/30.11
2002/0126596 A1 * 9/2002 Adachi ..................... 369/47.22

FOREIGN PATENT DOCUMENTS

JP 11-186992 7/1999
JP 2001-243727 9/2001

* cited by examiner

*Primary Examiner*—Muhammad Edun
(74) *Attorney, Agent, or Firm*—Louis Woo

(57) ABSTRACT

An information signal is read from a recording medium to generate a reproduced signal. A sync detector detects a sync signal in the reproduced signal on a pattern search basis during operation in a direct mode. The sync detector sets a detection window and detects a sync signal in the reproduced signal in the detection window during operation in an inertia mode. A special pattern signal in the reproduced signal is detected and counted to generate a count result. The count result is reset in response to detection of a first special signal in the reproduced signal. A detection flag is generated in cases where a second special signal in the reproduced signal is detected when the count result denotes a last sector in a block of the reproduced signal. The sync detector changes its operation from the inertia mode to the direct mode when the detection flag is generated.

10 Claims, 18 Drawing Sheets

SYNC SIGNAL DETECTED ----------
SYNC SIGNAL NON-DETECTED ———

METHOD AND APPARATUS FOR REPRODUCING INFORMATION

BACKGROUND OF THE INVENTION

1. Field of the Invention

This invention relates to an apparatus for reproducing information. Also, this invention relates to a method of reproducing information. In addition, this invention relates to a computer program for reproducing information. Furthermore, this invention relates to an information recording medium.

2. Description of the Related Art

Optical recording discs include Digital Versatile Discs (DVDs) of various types. Information recorded on each DVD is divided into ECC blocks. Each ECC block has a plurality of frames whose heads are loaded with sync signals respectively. Portions of the frames which follow their heads are loaded with information pieces respectively. The frames have a fixed length, and the positions of the sync signals are spaced at equal intervals. Therefore, during the reproduction of the information from the DVD, the sync signals are reproduced at constant intervals. In the case where the reproduced sync signals are counted and the period of the occurrence of the reproduced sync signals is calculated from the count result, it is possible to predict, from the calculated sync-signal period, a time position at which a next sync signal will be reproduced.

A typical information reproducing apparatus includes a synchronization circuit for detecting sync signals from a reproduced signal and synchronizing the reproduction of information with the reproduced signal in response to the detected sync signals. It is known to provide a synchronization circuit with sync protection and sync insertion.

The sync protection predicts a time position of a next sync signal in a reproduced signal, and sets a window at the predicted time position. Once the synchronization with the reproduced signal is acquired, the sync protection is sensitive to only a sync signal in the window and is insensitive to that outside the window. Accordingly, the synchronization is protected against a wrong sync signal, that is, a sync signal outside the window.

The sync insertion is active once the synchronization with the reproduced signal is acquired. When a sync signal in the window fails to be detected, the sync insertion generates a pseudo sync signal usable as a detected sync signal. Accordingly, the synchronization is maintained even in the event that the detection of a sync signal fails.

In the case where a sync signal in the last frame in an ECC block and a sync signal in the first frame in a next ECC block are spaced at an interval different from the normal value, the prediction-based sync protection tends to be unreliable at and around the boundary between ECC blocks.

Japanese patent application publication number 2001-243727 discloses an apparatus for reproducing information from an optical disc. The information recorded on the optical disc is divided into a plurality of frames having a fixed length corresponding to a prescribed number of clock periods. The heads of the frames have sync signals, respectively.

The apparatus in Japanese application 2001-243727 includes a circuit for detecting sync signals in a reproduced bit stream. The time position of a next sync signal is predicted from the number of clock periods between the detected sync signals. The predicted time position is used as a center window. Every detected sync signal in the center window is used as normal one. First, second, third, and fourth off-center windows are set. The first off-center window precedes the center window by two bits. The second off-center window precedes the center window by one bit. The third off-center window follows the center window by one bit. The fourth off-center window follows the center window by two bits. For each of the first to fourth off-center windows, successively detected sync signals therein are counted. When the number of successively detected sync signals in one of the first to fourth off-center windows reaches a prescribed value, a corresponding sync corrective signal is generated. The sync corrective signal causes the center window to shift to a position equal to that of the off-center window in question. Therefore, the center window is updated and corrected. Then, detected sync signals in the correction-resultant center window are used as normal sync signals.

SUMMARY OF THE INVENTION

It is a first object of this invention to provide an apparatus for reproducing information which is reliable even when a reproduced signal corresponds to the boundary between ECC blocks.

It is a second object of this invention to provide a method of reproducing information which is reliable even when a reproduced signal corresponds to the boundary between ECC blocks.

It is a third object of this invention to provide a computer program for reproducing information which is reliable even when a reproduced signal corresponds to the boundary between ECC blocks.

It is a fourth object of this invention to provide an improved information recording medium.

A first aspect of this invention provides an apparatus for detecting sync signals from a recording medium and reproducing information from the recording medium in response to the detected sync signals. The recording medium stores an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the blocks includes a first special signal in a position before a first sector. Each of the blocks includes a second special signal in a position after a last sector. The second special signal has a pattern equal to one of the different patterns for the sync signal. Each of the sectors includes a special pattern signal. The apparatus comprises first means for reading an information signal from a recording medium to generate a reproduced signal; a sync signal detector for detecting a sync signal in the reproduced signal generated by the first means, the sync signal detector operating in either a direct detection mode or an inertia mode, the sync signal detector detecting the sync signal on a pattern search basis during operation in the direct detection mode, the sync signal detector setting a sync detection window in response to the prescribed number of clock periods and detecting the sync signal in the sync detection window during operation in the inertia mode; second means for detecting a first special signal in the reproduced signal generated by the first means, and generating a first-special-signal detection flag upon detection of the first special signal; third means for detecting a special pattern signal in the reproduced signal generated by the first means, and generating a special-pattern detection flag upon detection of the special pattern signal; fourth means for detecting a second special signal in the reproduced signal generated by the first means, and generating a second-special-signal detection flag upon detection of the second special signal; a counter for counting the special-pattern detection flag generated by the third means to generate a special-pattern count number, and resetting the special-pattern count number in response to the first-special-signal detection flag generated by the second means; and fifth means for generating a specified-position detection flag in cases where the second-special-signal detection flag is generated by the fourth means when the special-pattern count number generated by the counter is equal to the natural number "m". The sync signal detector changes its operation from the inertia mode to the direct detection mode when the specified-position detection flag is generated by the fifth means.

A second aspect of this invention is based on the first aspect thereof, and provides an apparatus wherein the sync signal detector changes its operation from the direct detection mode to the inertia mode and sets a position of the sync detection window to a predicted position of a sync signal in a first frame when the first-special-signal detection flag is generated by the second means.

A third aspect of this invention is based on the first aspect thereof, and provides an apparatus wherein the sync signal detector comprises a delay circuit for using the reproduced signal generated by the first means as a first reproduced signal and delaying the first reproduced signal to generate a second reproduced signal; a first deciding section for deciding whether or not a sync signal in the first reproduced signal is in a first sync detection window; a second deciding section for deciding whether or not a sync signal in the second reproduced signal is in a second sync detection window; and an outputting section for, in cases where the second deciding section decides that a sync signal in the second reproduced signal is in a second sync detection window when the sync signal detector operates in the inertia mode, outputting the sync signal in the second sync detection window, and for, in cases where the first deciding section decides that a sync signal in the first reproduced signal is not in a first sync detection window when the sync signal detector operates in the inertia mode, outputting a pseudo sync signal at a predicted position of a sync signal in the second reproduced signal.

A fourth aspect of this invention is based on the first aspect thereof, and provides an apparatus wherein the sync signal detector comprises a delay circuit for using the reproduced signal generated by the first means as a first reproduced signal and delaying the first reproduced signal to generate a second reproduced signal; a deciding section for deciding whether or not a sync signal in the first reproduced signal is in a first sync detection window; and an outputting section for, in cases where the deciding section decides that a sync signal in the first reproduced signal is in a first sync detection window when the sync signal detector operates in the inertia mode, delaying the sync signal in the first sync detection window to generate a delay-resultant sync signal and outputting the delay-resultant sync signal, and for, in cases where the deciding section decides that a sync signal in the first reproduced signal is not in a first sync detection window when the sync signal detector operates in the inertia mode, outputting a pseudo sync signal at a predicted position of a sync signal in the second reproduced signal.

A fifth aspect of this invention provides an apparatus for detecting sync signals from a recording medium and reproducing information from the recording medium in response to the detected sync signals. The recording medium stores an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the blocks includes a first special signal in a position before a first sector. Each of the blocks includes a second special signal in a position after a last sector. The second special signal has a pattern equal to one of the different patterns for the sync signal. The information signal includes a sector address signal. The apparatus comprises first means for reading an information signal from a recording medium to generate a reproduced signal; a sync signal detector for detecting a sync signal in the reproduced signal generated by the first means, the sync signal detector operating in either a direct detection mode or an inertia mode, the sync signal detector detecting the sync signal on a pattern search basis during operation in the direct detection mode, the sync signal detector setting a sync detection window in response to the prescribed number of clock periods and detecting the sync signal in the sync detection window during operation in the inertia mode; second means for extracting a sector address signal from the reproduced signal generated by the first means; third means for detecting a first special signal in the reproduced signal generated by the first means, and generating a first-special-signal detection flag upon detection of the first special signal; and fourth means for detecting a second special signal in the reproduced signal generated by the first means, and generating a second-special-signal detection flag upon detection of the second special signal. The sync signal detector changes its operation from the inertia mode to the direct detection mode in cases where the second-special-signal detection flag is generated by the fourth means when the sector address signal extracted by the second means denotes a last sector in a block, and the sync signal detector changes its operation from the direct detection mode to the inertia mode when the first-special-signal detection flag is generated by the third means.

A sixth aspect of this invention provides an apparatus for detecting sync signals from a recording medium and reproducing information from the recording medium in response to the detected sync signals. The recording medium stores an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the sectors includes a special pattern signal. The information signal includes a sector address signal. The apparatus comprises first means for reading an information signal from a recording medium to generate a reproduced signal; a sync signal detector for detecting a sync signal in the reproduced signal generated by the first means, the sync signal detector operating in either a direct detection mode or an inertia mode, the sync signal detector detecting the sync signal on a pattern search basis during operation in the direct detection mode, the sync signal detector setting a sync detection window in response to the prescribed number of clock periods and detecting the sync signal in the sync detection window during operation in the inertia mode; second means for extracting a sector address signal from the reproduced signal generated by the first means; third means for detecting a special pattern signal in the reproduced signal generated by the first means, and generating a special-pattern detection flag upon detection of the special pattern signal; a counter for counting the special-pattern detection flag generated by the third means to generate a special-pattern count number, and resetting the special-pattern count number in response to a sync signal in a first frame in a first sector in a block which is detected by the sync signal detector; fourth means for changing operation of the sync signal detector from the inertia mode to the direct detection mode at a timing a prescribed time after a moment when the special-pattern count number generated by the counter reaches the natural number "m" or when the sector address signal extracted by the second means denotes a last sector in a block; fifth means for holding operation of the sync signal detector in the direct detection mode until a sync signal in a first frame in a first sector in a block is detected by the sync signal detector; and sixth means for changing operation of the sync signal detector from the direct detection mode to the inertia mode when a sync signal in a first frame in a first sector in a block is detected by the sync signal detector.

A seventh aspect of this invention provides a method of detecting sync signals from a recording medium and reproducing information from the recording medium in response to the detected sync signals. The recording medium stores an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the blocks includes a first special signal in a position before a first sector. Each of the blocks includes a second special signal in a position after a last sector. The second special signal has a pattern equal to one of the different patterns for the sync signal. Each of the sectors includes a special pattern signal. The method comprises the steps of reading an information signal from a recording medium to generate a reproduced signal; detecting a sync signal in the reproduced signal in either a direct detection mode of operation or an inertia mode of operation, and detecting the sync signal on a pattern search basis during the direct detection mode of operation, and setting a sync detection window in response to the prescribed number of clock periods and detecting the sync signal in the sync detection window during the inertia mode of operation; detecting a first special signal in the reproduced signal, and generating a first-special-signal detection flag upon detection of the first special signal; detecting a special pattern signal in the reproduced signal, and generating a special-pattern detection flag upon detection of the special pattern signal; detecting a second special signal in the reproduced signal, and generating a second-special-signal detection flag upon detection of the second special signal; counting the special-pattern detection flag to generate a special-pattern count number, and resetting the special-pattern count number in response to the first-special-signal detection flag; generating a specified-position detection flag in cases where the second-special-signal detection flag is generated when the special-pattern count number is equal to the natural number "m"; and replacing the inertia mode of operation by the direct detection mode of operation for detection of a sync signal when the specified-position detection flag is generated.

An eighth aspect of this invention provides a method of detecting sync signals from a recording medium and reproducing information from the recording medium in response to the detected sync signals. The recording medium stores an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the blocks includes a first special signal in a position before a first sector. Each of the blocks includes a second special signal in a position after a last sector. The second special signal has a pattern equal to one of the different patterns for the sync signal. The information signal includes a sector address signal. The method comprises the steps of reading an information signal from a recording medium to generate a reproduced signal; detecting a sync signal in the reproduced signal in either a direct detection mode of operation or an inertia mode of operation, and detecting the sync signal on a pattern search basis during the direct detection mode of operation, and setting a sync detection window in response to the prescribed number of clock periods and detecting the sync signal in the sync detection window during the inertia mode of operation; extracting a sector address signal from the reproduced signal; detecting a first special signal in the reproduced signal, and generating a first-special-signal detection flag upon detection of the first special signal; detecting a second special signal in the reproduced signal, and generating a second-special-signal detection flag upon detection of the second special signal; replacing the inertia mode of operation by the direct detection mode of operation for detection of a sync signal in cases where the second-special-signal detection flag is generated when the sector address signal denotes a last sector in a block; and replacing the direct detection mode of operation by the inertia mode of operation for detection of a sync signal when the first-special-signal detection flag is generated.

A ninth aspect of this invention provides a computer program for use in an apparatus for detecting sync signals from a recording medium and reproducing information from the recording medium in response to the detected sync signals. The recording medium stores an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the blocks includes a first special signal in a position before a first sector. Each of the blocks includes a second special signal in a position after a last sector. The second special signal has a pattern equal to one of the different patterns for the sync signal. Each of the sectors includes a special pattern signal. The apparatus reads the information signal from the recording medium to generate a reproduced signal. The computer program comprises the steps of detecting a sync signal in the reproduced signal in either a direct detection mode of operation or an inertia mode of operation, and detecting the sync signal on a pattern search basis during the direct detection mode of operation, and setting a sync detection window in response to the prescribed number of clock periods and detecting the sync signal in the sync detection window during the inertia mode of operation; detecting a first special signal in the reproduced signal, and generating a first-special-signal detection flag upon detection of the first special signal; detecting a special pattern signal in the reproduced signal, and generating a special-pattern detection flag upon detection of the special pattern signal; detecting a second special signal in the reproduced signal, and generating a second-special-signal detection flag upon detection of the second special signal; counting the special-pattern detection flag to generate a special-pattern count number, and resetting the special-pattern count number in response to the first-special-signal detection flag; generating a specified-position detection flag in cases where the second-special-signal detection flag is generated when the special-pattern count number is equal to the natural number "m"; and replacing the inertia mode of operation by the direct detection mode of operation for detection of a sync signal when the specified-position detection flag is generated.

A tenth aspect of this invention is based on the ninth aspect thereof, and provides a computer program further comprising the step of replacing the direct detection mode of operation by the inertia mode of operation for detection of a sync signal and setting a position of the sync detection window to a predicted position of a sync signal in a first frame when the first-special-signal detection flag is generated.

An eleventh aspect of this invention provides a computer program for use in an apparatus for detecting sync signals from a recording medium and reproducing information from the recording medium in response to the detected sync signals. The recording medium stores an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the blocks includes a first special signal in a position before a first sector. Each of the blocks includes a second special signal in a position after a last sector. The second special signal has a pattern equal to one of the different patterns for the sync signal. The information signal includes a sector address signal. The apparatus reads the information signal from the recording medium to generate a reproduced signal. The computer program comprises the steps of detecting a sync signal in the reproduced signal in either a direct detection mode of operation or an inertia mode of operation, and detecting the sync signal on a pattern search basis during the direct detection mode of operation, and setting a sync detection window in response to the prescribed number of clock periods and detecting the sync signal in the sync detection window during the inertia mode of operation; extracting a sector address signal from the reproduced signal; detecting a first special signal in the reproduced signal, and generating a first-special-signal detection flag upon detection of the first special signal; detecting a second special signal in the reproduced signal, and generating a second-special-signal detection flag upon detection of the second special signal; replacing the inertia mode of operation by the direct detection mode of operation for detection of a sync signal in cases where the second-special-signal detection flag is generated when the sector address signal denotes a last sector in a block; and replacing the direct detection mode of operation by the inertia mode of operation for detection of a sync signal when the first-special-signal detection flag is generated.

A twelfth aspect of this invention provides a recording medium storing an information signal divided into a plurality of blocks each including "m" sectors. Each of the sectors is divided into "n" frames having a length corresponding to a prescribed number of clock periods. The characters "m" and "n" denote natural numbers equal to or greater than 2. Each of the frames includes a sync signal having a pattern selected from 10 or less different patterns. Each of the blocks includes a first special signal in a position before a first sector. Each of the blocks includes a second special signal in a position after a last sector. The second special signal has a pattern equal to one of the different patterns for the sync signal. Each of the sectors includes a special pattern signal.

A thirteenth aspect of this invention provides an apparatus for reproducing information from a recording medium. The recording medium stores an information signal divided into a plurality of blocks each including a predetermined number of sectors. Each of the sectors is divided into a predetermined number of frames each having a predetermined length. Each of the frames includes a sync signal. Each of the blocks includes a first special signal in a position before a first frame in a first sector. Each of the blocks includes a second special signal in a position after a last frame in a last sector. The apparatus comprises first means for reading an information signal from a recording medium to generate a reproduced signal; second means for detecting a sync signal in the reproduced signal on a pattern search basis during operation in a direct detection mode, and for setting a sync detection window in response to the predetermined length and detecting a sync signal in the reproduced signal in the sync detection window during operation in an inertia mode; third means for detecting a first special signal in the reproduced signal; fourth means for detecting a second special signal in the reproduced signal; fifth means for deciding whether or not the reproduced signal currently corresponds to a last sector in a block; sixth means for changing operation of the second means from the inertia mode to the direct detection mode in response to the detection of the second special signal by the fourth means in cases where the fifth means decides that the reproduced signal currently corresponds to a last sector in a block; and seventh means for changing operation of the second means from the direct detection mode to the inertia mode in response to the detection of the first special signal by the third means.

DETAILED DESCRIPTION OF THE INVENTION

Prior-art information reproducing apparatuses will be explained below for a better understanding of this invention.

Figure 1:
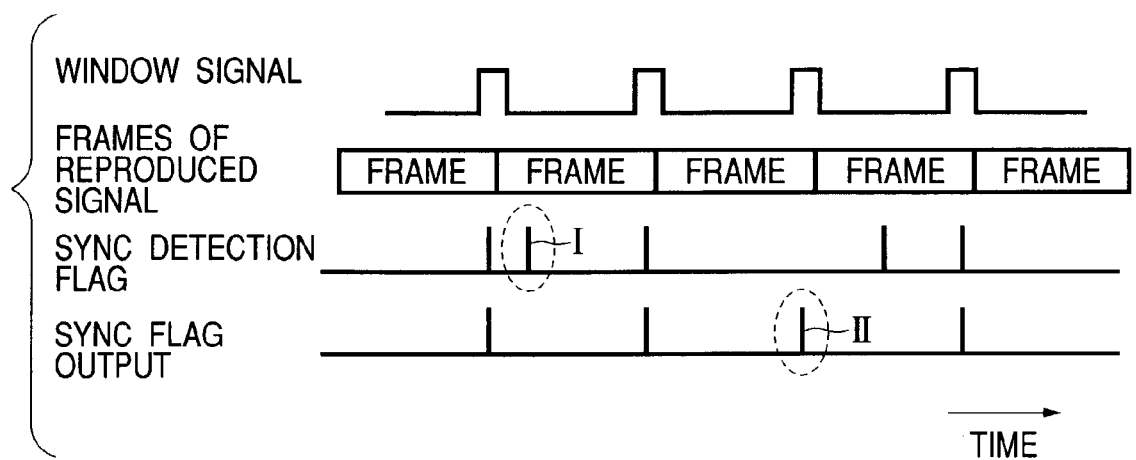
FIG. 1 is a time-domain diagram of various signals in a first prior-art information reproducing apparatus.

A first prior-art information reproducing apparatus generates a sync detection window signal which periodically assumes a high-level state corresponding to a sync detection window. The sync detection window signal has a waveform such as shown in FIG. 1. The sync detection window has a prescribed width. The sync detection window is centered at a predicted time position of a sync signal. As shown in FIG. 1, there is a succession of frames of a reproduced signal. The first prior-art apparatus detects sync signals and generates corresponding sync detection flags in synchronism with the frames of the reproduced signal (see FIG. 1). Sync detection flags in sync detection windows are used as effective ones constituting output sync flags or final sync flags as shown in FIG. 1. The final sync flags (the output sync flags) are utilized in providing the synchronization between the reproduced signal and the recovery of data therefrom. On the other hand, sync detection flags (for example, a sync detection flag I in FIG. 1) outside sync detection windows are neglected, and are excluded from final sync flags. Accordingly, the synchronization of the data recovery with the reproduced signal is protected against a wrong sync signal, that is, a sync signal outside a corresponding sync detection window. As shown in FIG. 1, the first prior-art apparatus generates a pseudo final sync flag II in the absence of a sync detection flag from a corresponding sync detection window.

Figure 2:
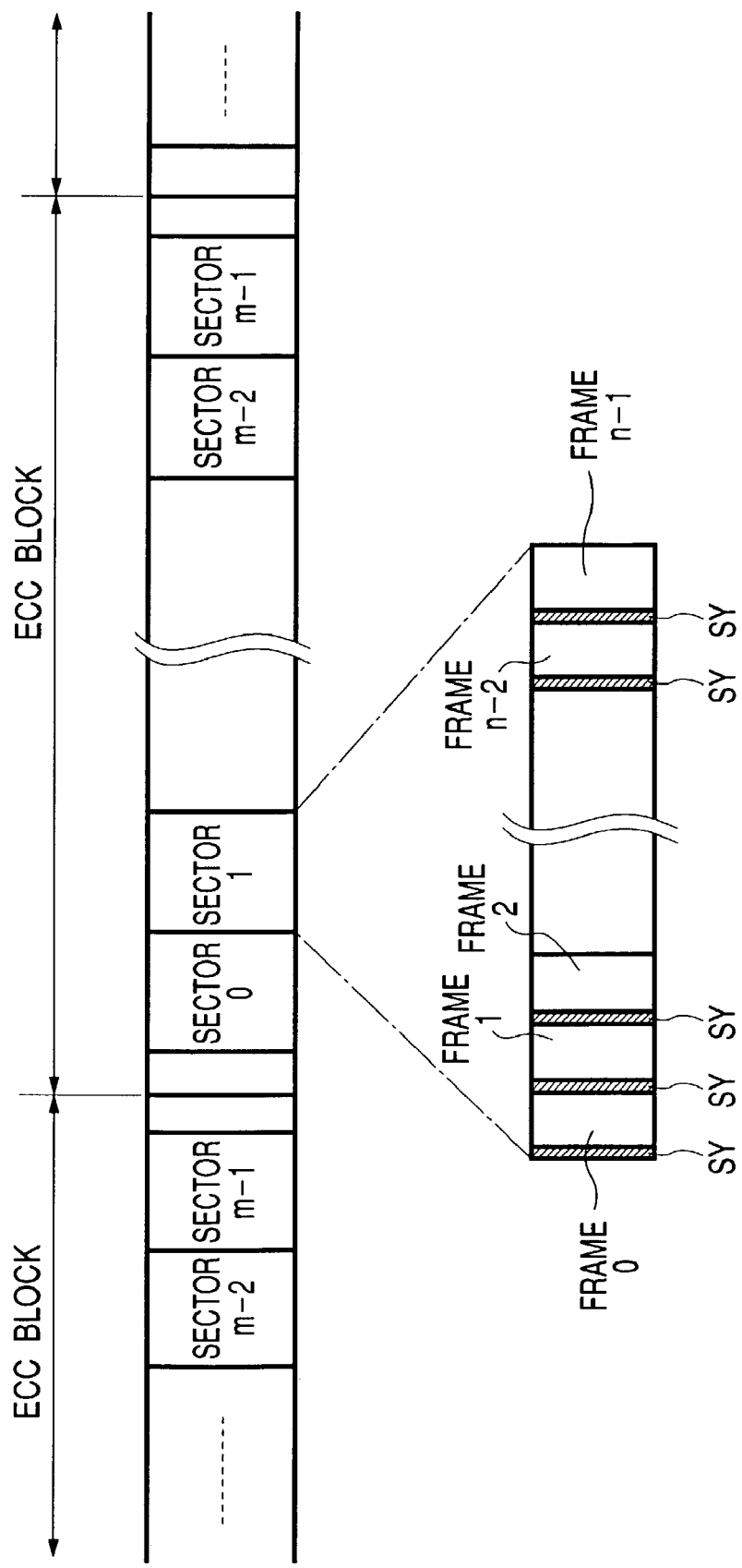
FIG. 2 is a diagram of ECC blocks, sectors, and frames of an information signal in a prior-art format.

FIG. 2 shows the conditions of an information signal in a prior-art format which is recorded on an optical disc. According to the prior-art format in FIG. 2, the information signal is divided into ECC blocks each having "m" sectors where "m" denotes a natural number equal to or greater than 2. Each sector is divided into "n" frames having a fixed length corresponding to a prescribed number of clock periods, where "n" denotes a natural number equal to or greater than 2. The head of each frame has a sync signal SY.

With reference to FIG. 2, one ECC block has "m" sectors starting from a sector "0" and ending in a sector "m−1". Each sector is composed of "n" frames starting from a frame "0" and ending in a frame "n−1". Each frame has a fixed length corresponding to a prescribed number of clock periods. Each frame is composed of a sync signal SY and a data piece following the sync signal SY. Normally, the sync signals are spaced at intervals corresponding to the prescribed number of clock periods. Each sync signal SY has a given number of successive bits in a pattern which is selected from predetermined patterns. The selection of the patterns of sync signals complies with a given rule designed so that frame ID (identification) numbers can be detected in response to the combination of patterns of successive sync signals during the reproduction of the information signal.

A second prior-art information reproducing apparatus is designed for an optical disc which stores an information signal in the prior-art format of FIG. 2. The second prior-art apparatus can operate in either a direct detection mode (also referred to as a direct mode) or an inertia mode. During the direct detection mode of operation, sync signals are detected by a pattern search in order to stably extract information from the sync signals and accurately recover data. During the inertia mode of operation, a sync detection window is periodically set at time intervals corresponding to the prescribed number of clock periods, and the read-out of a sync signal is executed only in the sync detection window.

Figure 3:
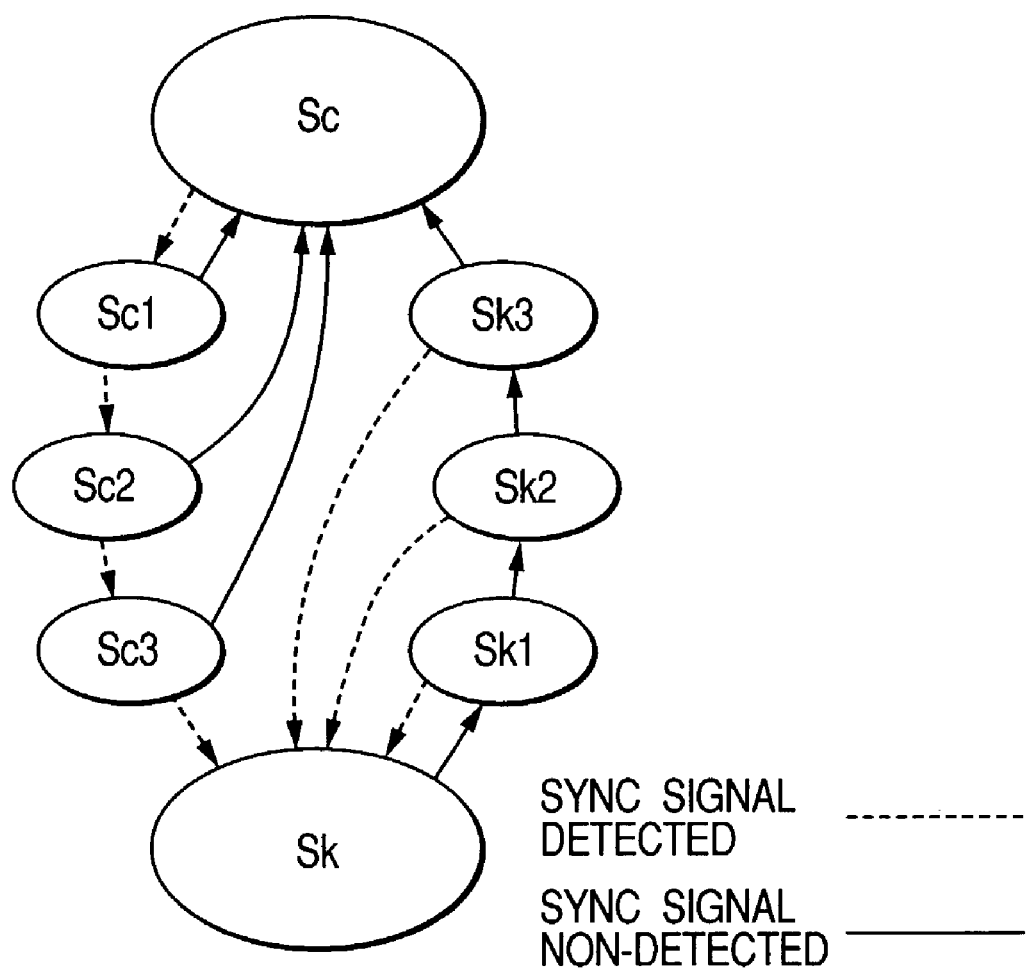
FIG. 3 is a diagram of the transition between the modes of operation of a second prior-art information reproducing apparatus.

FIG. 3 shows the transition between the modes of operation of the second prior-art apparatus. In FIG. 3, the characters Sc, Sc1, Sc2, and Sc3 denote the direct detection mode of operation while the characters Sk, Sk1, Sk2, and Sk3 denote the inertia mode of operation. As shown in FIG. 3, operation of the second prior-art apparatus changes from the direct detection mode Sc to the inertia mode Sk provided that four successive sync signals are detected. During the transition from the direct detection mode Sc to the inertia mode Sk, operation of the second prior-art apparatus passes through the intermediate stages Sc1, Sc2, and Sc3 of the direct detection mode. In the case where the detection of a sync signal fails at the intermediate stage Sc1, Sc2, or Sc3, operation of the second prior-art apparatus returns to the original direct detection mode Sc. Operation of the second prior-art apparatus changes from the inertia mode Sk to the direct detection mode Sc provided that the detection of a sync signal fails four consecutive times for frames. During the transition from the inertia mode Sk to the direct detection mode Sc, operation of the second prior-art apparatus passes through the intermediate stages Sk1, Sk2, and Sk3 of the inertia mode. In the case where a sync signal is detected at the intermediate stage Sk1, Sk2, or Sk3, operation of the second prior-art apparatus returns to the original inertia mode Sk.

Figure 4:
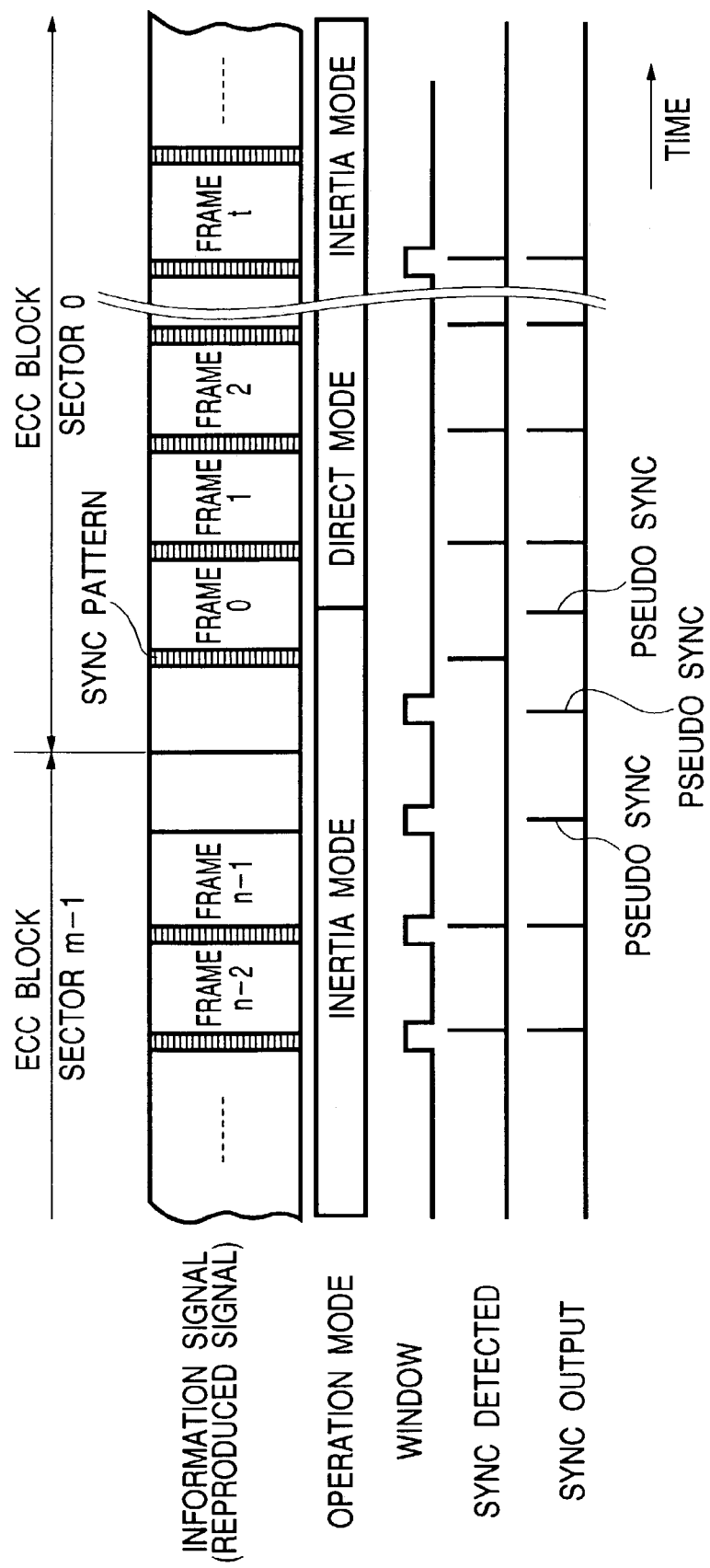
FIG. 4 is a time-domain diagram of a reproduced signal, the mode of operation of the second prior-art information reproducing apparatus, and various signals occurring in the second prior-art information reproducing apparatus during the reproduction of an information signal.

FIG. 4 shows the details of the boundary between ECC blocks in the information signal in the prior-art format of FIG. 2. In FIG. 4, the information signal is illustrated as a reproduced signal. FIG. 4 also shows the mode of operation of the second prior-art apparatus and the conditions of various signals occurring therein during the reproduction of the information signal.

As shown in FIG. 4, the interval between the last sync signal in an ECC block (a first ECC block) and the first sync signal in a next ECC block (a second ECC block) differs from the normal value corresponding to the prescribed number of clock periods.

In FIG. 4, operation of the second prior-art apparatus remains in the inertia mode as the last sector "m−1" in the first ECC block is replaced by the first sector "0" in the second ECC block. The detection of a normal sync signal fails a few consecutive times and pseudo sync signals are outputted accordingly before operation of the second prior-art apparatus changes from the inertia mode to the direct detection mode. As previously mentioned, the pattern search is executed to detect sync signals during the direct detection mode of operation. After a given number of successive sync signals are detected in sync detection windows, operation of the second prior-art apparatus changes from the direct detection mode to the inertia mode.

In FIG. 4, the timing of the transition from the inertia mode to the direct detection mode is equal to a time position within the first frame "0" in the first sector "0" of the second ECC block. In this case, it is difficult to correctly extract data from a head portion of the second ECC block. A normal sequence of steps of operation of the second prior-art apparatus is as follows. When the inertia mode is replaced by the direct detection mode, the second prior-art apparatus implements reprocessing about the detection of sync signals at the first frame "0" in the first sector "0" of the second ECC block. After the reprocessing is completed, a preliminary sync detection window is periodically set. In the case where the given number of successive sync signals are detected in preliminary sync detection windows, operation of the second prior-art apparatus changes from the direct detection mode to the inertia mode. Furthermore, every sync detection window is finally decided in accordance with preliminary one.

Figure 5:
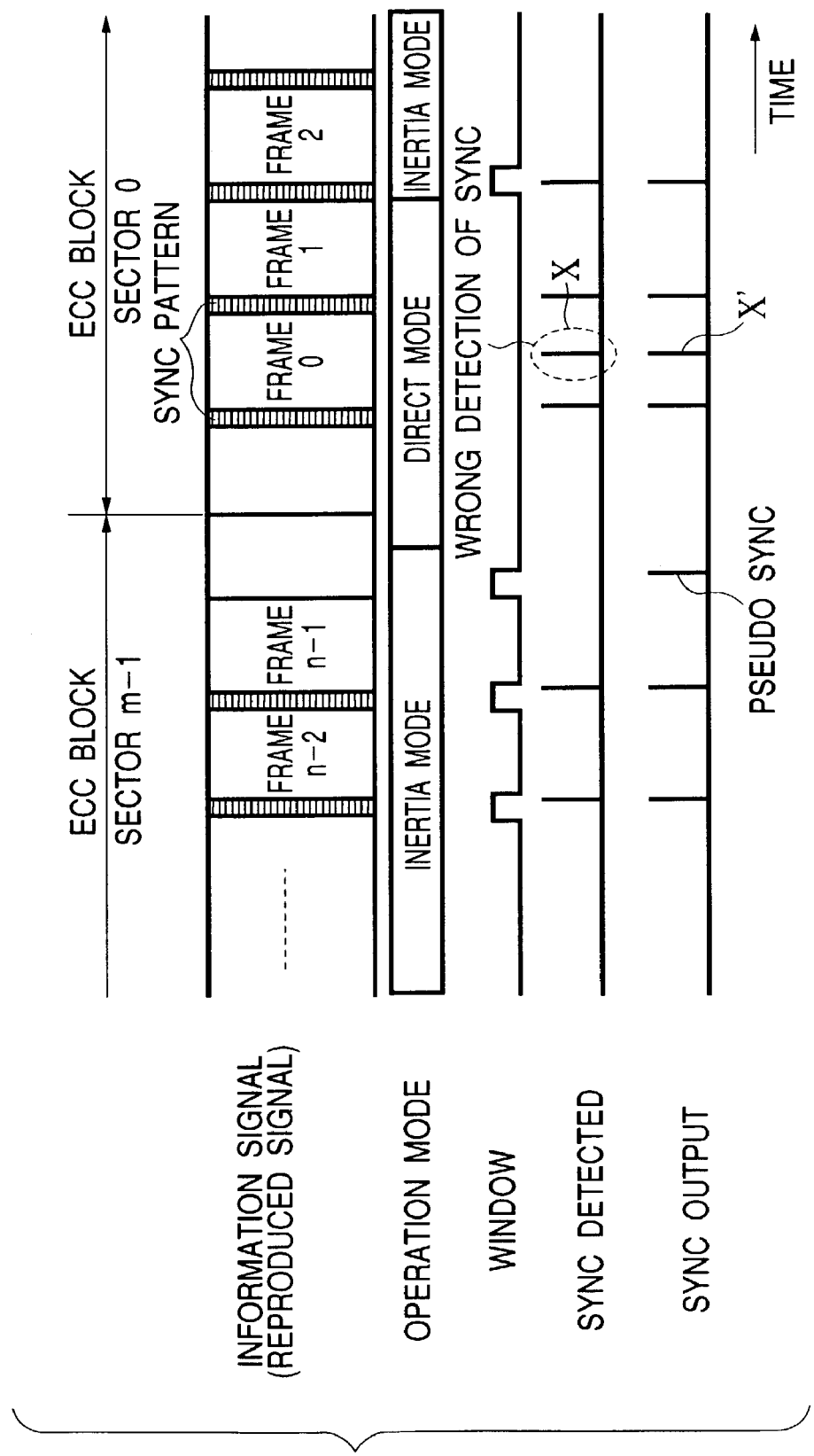
FIG. 5 is a time-domain diagram of a reproduced signal, the mode of operation of the second prior-art information reproducing apparatus, and various signals occurring in the second prior-art information reproducing apparatus during the reproduction of an information signal.

With reference to FIG. 5, operation of the second prior-art apparatus changes from the inertia mode to the direct detection mode before a first ECC block is replaced by a second ECC block. After the change to the direct detection mode, the second prior-art apparatus executes the reprocessing about the detection of sync signals at the first frame "0" in the first sector "0" of the second ECC block. During the execution of the reprocessing about the detection of sync signals, since sync detection windows have not yet been set, the second prior-art apparatus tends to suffer from wrong detection of sync signals. In the event that wrong detection of a sync signal occurs as denoted by X in FIG. 5, the detected sync signal is erroneously outputted as normal one X'. Therefore, in this case, detected sync signals are outputted at irregular intervals so that a timing of change from the direct detection mode to the inertia mode is delayed. In the event that wrong detection of a sync signal periodically occurs, operation of the second prior-art apparatus hardly changes from the direct detection mode to the inertia mode. During the direct detection mode of operation, although a sync signal of a first frame is correctly recognized, the second prior-art apparatus executes useless steps such as a step of setting a sync detection window and a step of detecting a sync-signal continuity or a sync-signal seriality.

The second prior-art apparatus predicts that a sync signal will be detected at a time position the 1-frame-period (the prescribed number of clock periods) after the time position of detection of an immediately-preceding sync signal. Thus, the second prior-art apparatus sets a sync detection window centered at the predicted time position of detection of a sync signal. It is difficult to know what position in a sync detection window a corresponding sync signal will be detected. Accordingly, a pseudo sync signal is inhibited from being generated and inserted until the sync detection window terminates. Thus, under given conditions, the second prior-art apparatus generates and inserts a pseudo sync signal when a sync detection window terminates. In general, the second prior-art apparatus includes an ECC circuit required to discriminate between an ordinary sync signal and a pseudo sync signal.

First Embodiment

According to a first embodiment of this invention, an information recording medium includes an optical disc storing an information signal. The information signal is in a prescribed format as follows. The information signal recorded on the optical disc is divided into a plurality of blocks. The information signal recorded on the optical disc may be divided into a prescribed number of blocks. Preferably, the blocks are ECC blocks. Each block is divided into "m" sectors, where "m" denotes a predetermined natural number equal to or greater than 2. Each sector is divided into "n" frames, where "n" denotes a predetermined natural number equal to or greater than 2. The frames have a predetermined length corresponding to a prescribed number of clock periods (bit-clock periods). Sync signals are inserted in the frames, respectively. The sync signals have patterns selected from 10 or less different predetermined patterns. Specifically, each of the sync signals has a given number of successive bits in a pattern selected from 10 or less different predetermined patterns. In each block, a first special signal is inserted in a place immediately before the first sector while a second special signal is inserted in a place immediately after the last sector. In more detail, a first special signal is in a place immediately before the first frame in the first sector of each block while a second special signal is in a place immediately after the last frame in the last sector of each block. Preferably, the second special signal has one of the predetermined patterns for the sync signals.

Figure 6:
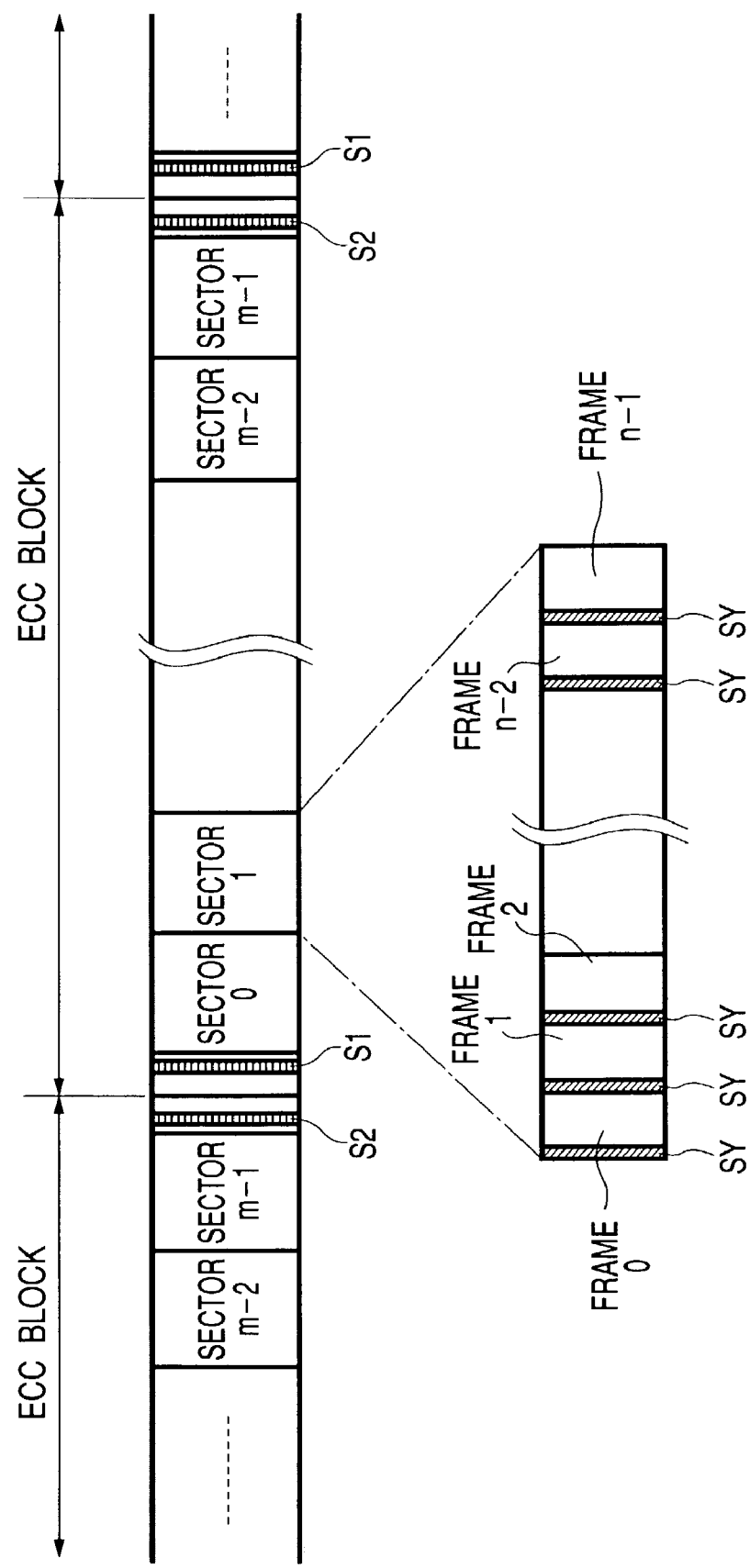
FIG. 6 is a diagram of a prescribed format of an information signal recorded on an optical disc according to a first embodiment of this invention.

FIG. 6 shows the prescribed format of the information signal recorded on the optical disc. According to the prescribed format in FIG. 6, the information signal is divided into ECC blocks each including "m" sectors. Each sector is divided into "n" frames having a fixed length corresponding to a prescribed number of clock periods. The head of each frame has a sync signal SY.

With reference to FIG. 6, one ECC block has "m" sectors starting from a sector "0" and ending in a sector "m−1". Each sector is composed of "n" frames starting from a frame "0" and ending in a frame "n−1". Each frame has a fixed length corresponding to a prescribed number of clock periods. Each frame is composed of a sync signal SY and a data piece following the sync signal SY. Normally, the sync signals are spaced at intervals corresponding to the prescribed number of clock periods. Each sync signal SY has a given number of successive bits in a pattern selected from 10 or less different predetermined patterns. In each ECC block, a first special signal S1 is inserted in a place immediately before the first sector (the sector "0") while a second special signal S2 is inserted in a place immediately after the last sector (the sector "m−1"). In more detail, a first special signal S1 is in a place immediately before the first frame (the frame "0") in the first sector (the sector "0") of each ECC block while a second special signal S2 is in a place immediately after the last frame (the frame "n−1") in the last sector (the sector "m−1") of each ECC block. Preferably, the second special signal S2 has one of the predetermined patterns for the sync signals SY.

According to a modification, one of predetermined patterns is assigned to the second special signal S2 while the other predetermined patterns are assigned to the sync signals SY.

The predetermined patterns for the sync signals SY are serially numbered. Specifically, the predetermined patterns are denoted by SY0, SY1, SY2, . . . , and SY9, respectively. Preferably, the predetermined patterns SY0–SY9 are assigned to sync signals in frames of a sector in a manner such that the ID (identification) numbers of the frames can be estimated from a combination of the patterns of successively detected sync signals during the reproduction of the information signal. Preferably, the assignment of the predetermined patterns SY0–SY9 to sync signals in frames is common to all the sectors. It should be noted that the assignment may vary from sector to sector. An example of the assignment of the predetermined patterns SY0–SY9 to sync signals in frames is as follows. In each of the sectors, the predetermined patterns SY0, SY1, SY2, SY3, SY3, and SY2 are assigned to sync signals SY in frames having ID numbers "0", "1", "2", "3", "4", and "5" (that is, frames "0", "1", "2", "3", "4", and "5"), respectively. This assignment enables the frame ID numbers to be detected in response to the combination of the patterns of successively detected sync signals during the reproduction of the information signal.

Preferably, the first special signal S1 has one of the predetermined patterns for the sync signals SY. The first special signal S1 may have a pattern different from the predetermined patterns for the sync signals SY. As previously mentioned, the second special signal S2 preferably has one of the predetermined patterns for the sync signals SY. The second special signal S2 may have a pattern different from the predetermined patterns for the sync signals SY. The patterns of the first and second special signals S1 and S2 differ from each other.

According to a modification, two of predetermined patterns are assigned to the first and second special signals S1 and S2 respectively while the other predetermined patterns are assigned to the sync signals SY.

It is preferable that in each of the sectors, the predetermined pattern SY0 is assigned to only a sync signal in a frame having an ID number "0" (that is, a frame "0"). In this case, the sync signal having the predetermined pattern SY0 indicates a frame having an ID number "0". Preferably, the sync signal having the predetermined pattern SY0 is defined as a special pattern signal detected only once in one sector. The special pattern signal may have a given pattern different from the predetermined patterns for the sync signals SY.

Preferably, each of the sectors has only one set of two or more successive sync signals having serial ones (serially-numbered ones) among the predetermined patterns SY0–SY9. For example, in each of the sectors, sync signals in successive frames "0", "1", "2", and "3" have serial patterns SY0, SY1, SY2, and SY3 respectively. Accordingly, every sector can be counted in response to the detection of successive sync signals having serial ones among the predetermined patterns SY0–SY9. Successive sync signals having serial ones among the predetermined patterns SY0–SY9 may compose the special pattern signal detected only once in one sector.

Figure 7:
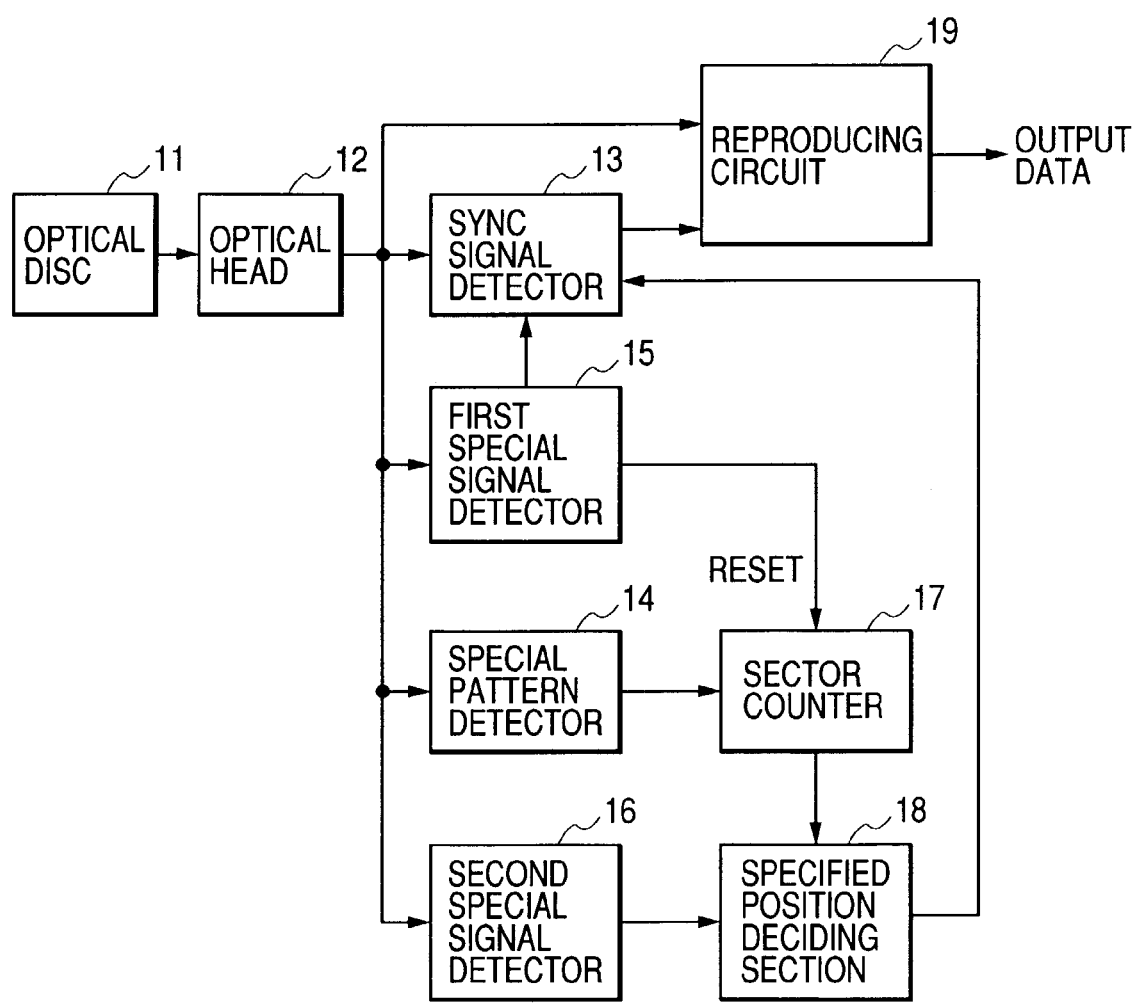
FIG. 7 is a block diagram of an information reproducing apparatus in the first embodiment of this invention.

FIG. 7 shows an information reproducing apparatus according to the first embodiment of this invention. The apparatus of FIG. 7 operates on an optical disc 11. The optical disc 11 stores an information signal in the previously-mentioned prescribed format.

Figure 8:
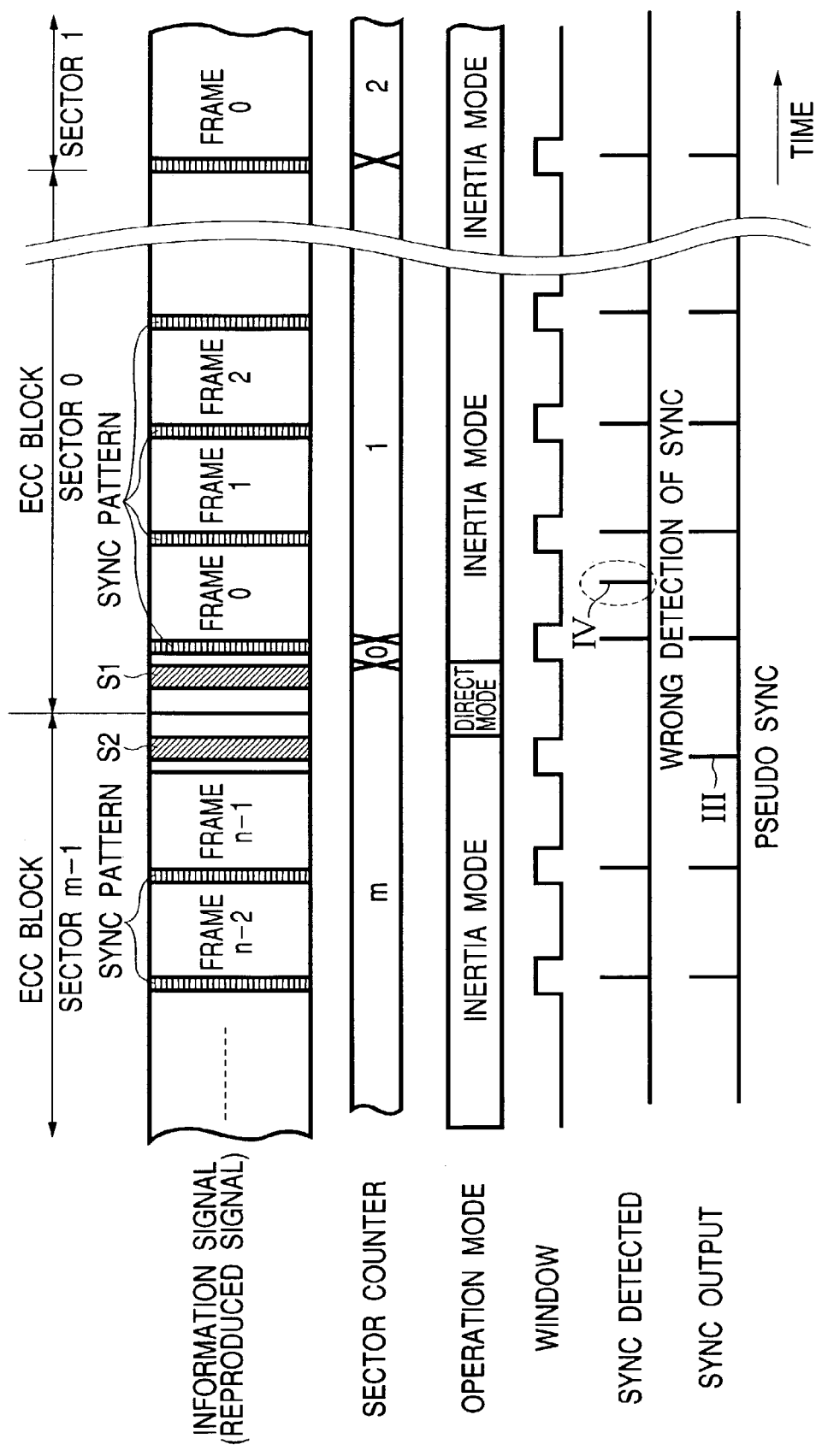
FIG. 8 is a time-domain diagram of a reproduced signal, the mode of operation of a sync signal detector, and various signals which occur during the reproduction of an information signal in the information reproducing apparatus of FIG. 7.

FIG. 8 shows the condition of a portion of the information signal which extends at and around the boundary of two adjacent ECC blocks. In FIG. 8, the information signal is illustrated as a reproduced signal. FIG. 8 also shows the mode of operation of a sync signal detector 13 in the apparatus of FIG. 7 during the reproduction of the information signal. FIG. 8 further shows the conditions of various signals occurring in the apparatus of FIG. 7 during the reproduction of the information signal.

As shown in FIG. 8, the interval between the last sync signal in an ECC block (a first ECC block) and the first sync signal in a next ECC block (a second ECC block) differs from the normal value corresponding to the prescribed number of clock periods.

The apparatus of FIG. 7 includes a known optical head 12. The optical head 12 reads the information signal from the optical disc 11, and generates the resultant signal referred to as the reproduced signal. The optical head 12 feeds the reproduced signal to a sync signal detector 13, a special pattern detector 14, a first-special-signal detector 15, a second-special-signal detector 16, and a reproducing circuit 19.

The sync signal detector 13 functions to detect every sync signal in the reproduced signal. The sync signal detector 13 can operate in either a direct detection mode or an inertia mode. The direct detection mode is also referred to as the direct mode. During the direct detection mode of operation, the device 13 detects sync signals on a pattern-search basis. During the inertia mode of operation, the device 13 detects sync signals while periodically setting a sync detection window at time intervals corresponding to the prescribed number of clock periods. The sync signal detector 13 uses sync signals detected in sync detection windows as correct ones, and neglects sync signals detected outside the sync detection windows. The sync signal detector 13 outputs the correct sync signals to the reproducing circuit 19.

During the inertial mode of operation, the sync signal detector 13 can generate pseudo sync signals under given conditions. The sync signal detector 13 outputs the pseudo sync signals to the reproducing circuit 19 as correct sync signals.

The special pattern detector 14 functions to detect the special pattern signal in the reproduced signal. A first example of the special pattern signal is the first sync signal in each sector which has the predetermined pattern SY0. A second example of the special pattern signal is the set of two or more successive sync signals having serial ones among the predetermined patterns SY0–SY9. As previously mentioned, such a set of two or more successive sync signals is only one in each sector. Upon the detection of every special pattern signal, the special pattern detector 14 outputs a corresponding detection flag to a counter 17. The device 17 acts as a sector counter. Specifically, the device 17 counts every detection flag outputted from the special pattern detector 14. The resultant count number given by the counter 17 increments as the sector in the reproduced signal is updated from one to another. Thus, the count number given by the counter 17 means a sector count number.

At an initial stage of reproducing operation of the apparatus in FIG. 7, the sync signal detector 13 operates in the direct detection mode and detects sync signals in the reproduced signal on a pattern-search basis. The sync signal detector 13 sets a preliminary sync detection window for a next sync signal in response to the latest detected sync signal and also the prescribed interval between two adjacent sync signals. The sync signal detector 13 decides whether or not the next detected sync signal is in the preliminary sync detection window. When the next detected sync signal is in the preliminary sync detection window, the sync signal detector 13 concludes the preliminary sync detection window to be a formal sync detection window. On the other hand, when the next detected sync signal is outside the preliminary sync detection window, the sync signal detector 13 sets a next preliminary sync detection window.

In the case where a given number of successive sync signals are detected in preliminary sync detection windows, operation of the sync signal detector 13 changes from the direct detection mode to the inertia mode. Otherwise, the sync signal detector 13 continues to operate in the direct detection mode.

During the inertia mode of operation, the sync signal detector 13 settles a formal sync detection window for a next sync signal in response to the latest detected sync signal and also the prescribed number of clock periods, that is, the prescribed interval between two adjacent sync signals. The sync signal detector 13 decides whether or not a detected sync signal is in the formal sync detection window. The sync signal detector 13 neglects a sync signal detected outside the formal sync detection window. When a sync signal is detected in the formal sync detection window, the sync signal detector 13 sets a next formal sync detection window in response to the detected sync signal and also the prescribed number of clock periods (the prescribed interval between two adjacent sync signals). When a detected sync signal is absent from the formal sync detection window, the sync signal detector 13 generates a pseudo sync signal and inserts the pseudo sync signal in its output signal. Then, the sync signal detector 13 sets a next formal sync detection window in response to the pseudo sync signal and also the prescribed number of clocks. In the case where a detected sync signal continues to be absent from a given number of successive formal sync detection windows, operation of the sync signal detector 13 changes from the inertia mode to the direct detection mode.

With reference to FIG. 8, the count number given by the counter 17 increments in accordance with the updating of the sector in the reproduced signal. Operation of the sync signal detector 13 alternates between the direct detection mode and the inertia mode. A formal sync detection window is periodically set during operation of the sync signal detector 13 in the inertia mode. A sync signal detected by the sync signal detector 13 occurs repetitively. Sync signals detected in formal windows are outputted from the sync signal detector 13 as correct ones. As shown in FIG. 8, during operation in the inertia mode, the sync signal detector 13 outputs a pseudo sync signal III in the absence of a sync signal detected in a corresponding formal sync detection window.

For a portion of the reproduced signal which extends at and around the boundary between ECC blocks, the apparatus of FIG. 7 operates as follows. As previously mentioned, the first special signal S1 exists in a place immediately before the first frame (the frame "0") in the first sector (the sector "0") of each ECC block. The first-special-signal detector 15 receives the reproduced signal from the optical head 12. The device 15 detects each first special signal S1 in the reproduced signal. Upon the detection of each first special signal S1, the first-special-signal detector 15 outputs a corresponding detection flag to the sync signal detector 13 and the counter 17. The detection flag outputted from the first-special-signal detector 15 to the counter 17 is used as a reset signal for the counter 17. In response to the detection flag from the first-special-signal detector 15, the counter 17 is reset so that the sector count number given by the counter 17 is retuned to "0" as shown in FIG. 8. The special pattern detector 14 detects the special pattern signal in the reproduced signal for each sector. Upon the detection of every special pattern signal, the special pattern detector 14 outputs a corresponding detection flag to the counter 17. The device 17 counts every detection flag from the special pattern detector 14. After the counter 17 is reset, the count number given by the counter 17 increments as the sector in the reproduced signal is updated from one to another (see FIG. 8). The counter 17 feeds a signal representative of the sector count number to a specified-position deciding section 18.

As previously mentioned, the second special signal S2 exists in a place immediately after the last frame (the frame "n−1") in the last sector (the sector "m−1") of each ECC block. The second-special-signal detector 16 receives the reproduced signal from the optical head 12. The device 16 detects each second special signal S2 in the reproduced signal. Upon the detection of each second special signal S2, the second-special-signal detector 16 outputs a corresponding detection flag to the specified-position deciding section 18.

The specified-position deciding section 18 decides whether or not the sector count number given by the counter 17 reaches "m", that is, the total number of sectors in one ECC block. When the sector count number reaches "m", the specified-position deciding section 18 judges the current sector to be last one in the current ECC block. In this case, when a detection flag is fed from the second-special-signal detector 16, the specified-position deciding section 18 concludes the current position in the reproduced signal to be coincident with a specified position immediately after the last frame (the frame "n−1") in the last sector (the sector "m−1") of the current ECC block. At this time, the specified-position deciding section 18 generates a specified-position detection signal indicating that the current position in the reproduced signal is coincident with the specified position. The specified-position deciding section 18 feeds the specified-position detection signal to the sync signal detector 13.

As shown in FIG. 8, operation of the sync signal detector 13 changes from the inertia mode to the direct detection mode in response to the specified-position detection signal outputted from the specified-position deciding section 18. In other words, operation of the sync signal detector 13 changes from the inertia mode to the direct detection mode when the sector count number is equal to "m" and the second special signal S2 is detected by the device 16. During a later stage, operation of the sync signal detector 13 changes from the direct detection mode to the inertia mode when the sync signal detector 13 receives the detection flag from the first-special-signal detector 15.

As previously mentioned, the sync signal detector 13 outputs correct sync signals to the reproducing circuit 19.

The correct sync signals include ordinary sync signals and also pseudo sync signals. The reproducing circuit 19 uses the correct sync signals in extracting data from the reproduced signal and decoding the extracted data. In other words, the reproducing circuit 19 recovers original information (original data) from the reproduced signal in response to the correct sync signals. The reproducing circuit 19 includes, for example, an ECC circuit and other circuits.

Operation of the sync signal detector 13 is changed from the inertia mode to the direct detection mode at a timing which corresponds to a position in an end portion of each ECC block. Therefore, data in a head portion of a next ECC block can be correctly recovered. In addition, the sync signal detector 13 can operate stably.

It is possible to prevent the timing of operation change to the inertia mode from being delayed by wrong detection of a sync signal after operation of the sync signal detector 13 changes to the direct detection mode for an end portion of each ECC block. The sync signal detector 13 operates in the inertia mode from a timing which is immediately before or coincident with the start of the first frame (the frame "0") in the first sector (the sector "0") of each ECC block. In the case where wrong detection of a sync signal IV outside formal sync detection windows occurs at a moment corresponding to a place within the first frame (the frame "0") in the first sector (the sector "0") of an ECC block as shown in FIG. 8, the sync signal detector 13 prevents the wrong sync signal IV from being outputted as correct one since the wrong sync signal IV is outside the formal sync detection windows. Therefore, data in a head portion of each ECC block can be correctly recovered.

Figure 9:
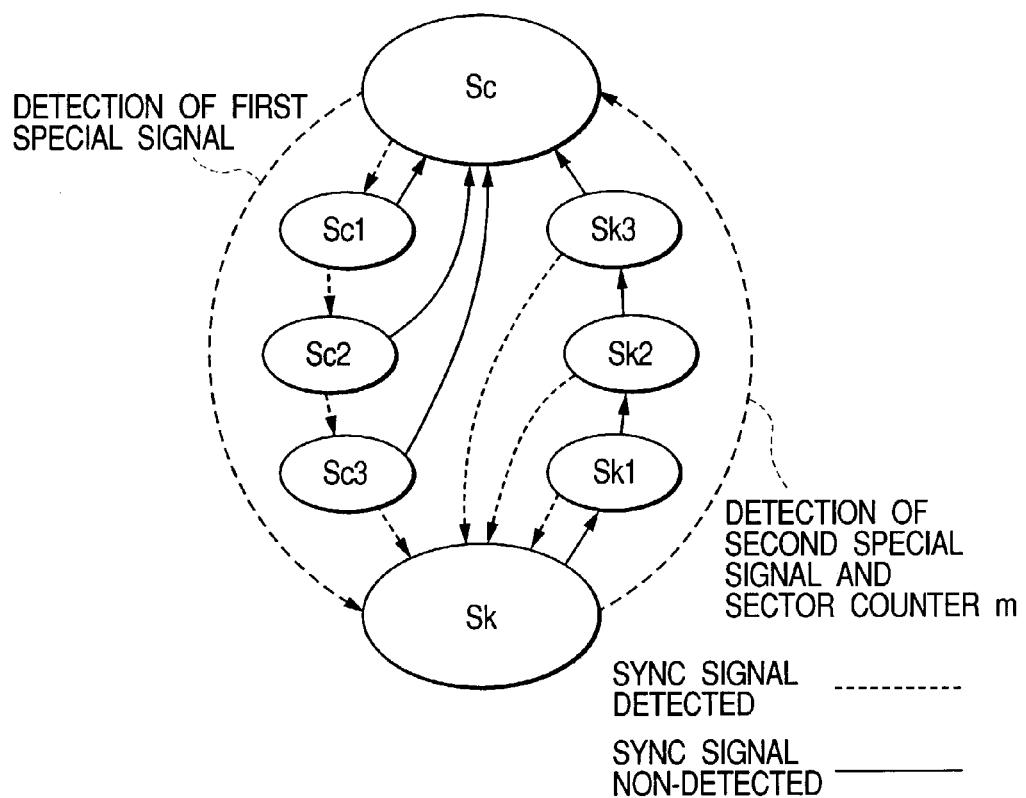
FIG. 9 is a diagram of the transition between the modes of operation of the sync signal detector in the information reproducing apparatus of FIG. 7.

FIG. 9 shows the transition between the modes of operation of the sync signal detector 13. In FIG. 9, the characters Sc, Sc1, Sc2, and Sc3 denote the direct detection mode of operation while the characters Sk, Sk1, Sk2, and Sk3 denote the inertia mode of operation. As shown in FIG. 9, operation of the sync signal detector 13 changes from the direct detection mode Sc to the inertia mode Sk provided that four successive sync signals are correctly detected. During the transition from the direct detection mode Sc to the inertia mode Sk, operation of the sync signal detector 13 passes through the intermediate stages Sc1, Sc2, and Sc3 of the direct detection mode. In the case where the detection of a correct sync signal fails at the intermediate stage Sc1, Sc2, or Sc3, operation of the sync signal detector 13 returns to the original direct detection mode Sc. Operation of the sync signal detector 13 changes from the inertia mode Sk to the direct detection mode Sc provided that the detection of a correct sync signal fails four consecutive times for frames. During the transition from the inertia mode Sk to the direct detection mode Sc, operation of the sync signal detector 13 passes through the intermediate stages Sk1, Sk2, and Sk3 of the inertia mode. In the case where a correct sync signal is detected at the intermediate stage Sk1, Sk2, or Sk3, operation of the sync signal detector 13 returns to the original inertia mode Sk.

As shown in FIG. 9, operation of the sync signal detector 13 is changed from the direct detection mode Sc to the inertia mode Sk when the sync signal detector 13 receives, from the first-special-signal detector 15, the detection flag indicating the detection of the first special signal S1. Operation of the sync signal detector 13 is changed from the inertia mode Sk to the direct detection mode Sc when the sector count number is "m" and the second special signal S2 is detected by the device 16.

Second Embodiment

An information reproducing apparatus in a second embodiment of this invention is similar to that in the first embodiment of this invention except for design changes mentioned hereafter. The apparatus in the second embodiment of this invention includes a sync signal detector 13A instead of the sync signal detector 13 (see FIG. 7).

When the first special signal S1 is detected, operation of the sync signal detector 13A changes from the direct detection mode to the inertia mode and the sync signal detector 13 sets a formal sync detection window in an estimated time position or a predicted time position of a sync signal in the first frame (the frame "0" in the sector "0") of an ECC block. The sync signal detector 13A responds to a reproduced signal "A" outputted from the optical head 12 (see FIG. 7). The sync signal detector 13A delays the reproduced signal "A" by a predetermined time L to get a reproduced signal "B". The predetermined time L is also referred to as the delay time L. The sync signal detector 13A also responds to the reproduced signal "B". An ECC circuit in a later stage, for example, an ECC circuit in the reproducing circuit 19 (see FIG. 7), uses the reproduced signal "B".

Figure 10:
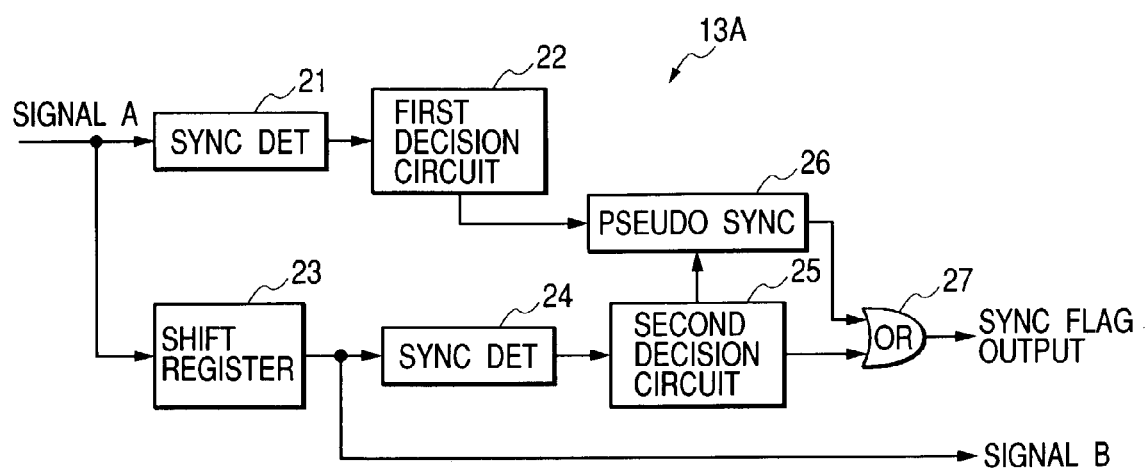
FIG. 10 is a block diagram of a sync signal detector in an information reproducing apparatus according to a second embodiment of this invention.
Figure 11:
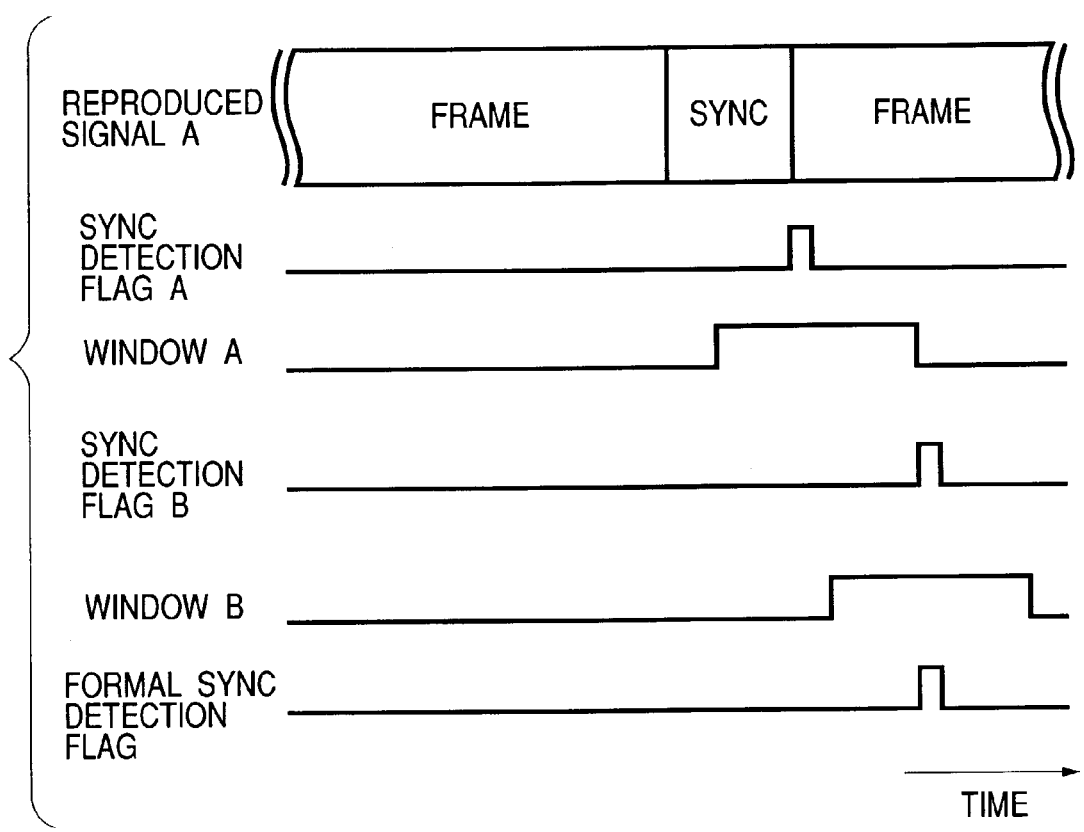
FIG. 11 is a time-domain diagram of various signals occurring in the information reproducing apparatus of the second embodiment of this invention.

FIG. 10 shows a portion of the sync signal detector 13A. As shown in FIG. 10, the sync signal detector 13A includes a sync detection circuit 21 which receives the reproduced signal "A" from the optical head 12 (see FIG. 7). The sync detection circuit 21 detects a sync signal in each frame of the reproduced signal "A". As shown in FIG. 11, upon the detection of a sync signal, the sync detection circuit 21 outputs a sync detection flag "A". The sync detection flag "A" is fed from the sync detection circuit 21 to a first decision circuit 22.

During operation of the sync signal detector 13A in the inertia mode, the first decision circuit 22 is informed of a sync detection window "A" generated on the basis of the reproduced signal "A". The first decision circuit 22 may have a portion for generating the sync detection window "A" in response to the reproduced signal "A". The first decision circuit 22 determines whether or not the time position of the sync detection flag "A" is in the sync detection window "A".

As shown in FIG. 10, the sync signal detector 13A includes a shift register 23 having a given number of stages which corresponds to the predetermined time (the delay time) L. The shift register 23 receives the reproduced signal "A" from the optical head 12 (see FIG. 7). The shift register 23 delays the reproduced signal "A" by the predetermined time L to get the reproduced signal "B". The predetermined time L corresponds to a given number of clock periods. The reproducing circuit 19 (see FIG. 7) may receive the reproduced signal "B" instead of the reproduced signal "A" outputted from the optical head 12 (see FIG. 7).

A sync detection circuit 24 receives the reproduced signal "B" from the shift register 23. The sync detection circuit 24 detects a sync signal in each frame of the reproduced signal "B". As shown in FIG. 11, upon the detection of a sync signal, the sync detection circuit 24 outputs a sync detection flag "B". The sync detection flag "B" is fed from the sync detection circuit 24 to a second decision circuit 25.

During operation of the sync signal detector 13A in the inertia mode, the second decision circuit 25 is informed of a sync detection window "B" generated on the basis of the reproduced signal "B". The second decision circuit 25 may have a portion for generating the sync detection window "B" in response to the reproduced signal "B". The second decision circuit 25 determines whether or not the time position of the sync detection flag "B" is in the sync detection window "B".

The delay time L provided by the shift register 23, and the sizes (the time widths) of the sync detection windows "A" and "B" are chosen to meet given conditions as follows. The sizes of the sync detection windows "A" and "B" are set to a value 2M+1 or a value 2M. The value 2M+1 corresponds to an odd number of clock periods. The value 2M corresponds to an even number of clock periods. The delay time L and the sizes of the sync detection windows "A" and "B" are designed so that the end of the window "A" precedes the center of the window "B".

Figure 12:
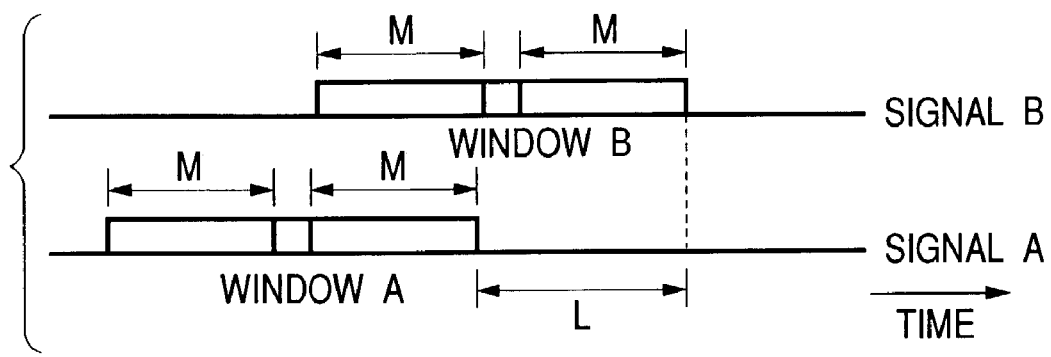
FIG. 12 is a time-domain diagram showing first conditions of sync detection windows "A" and "B" which are set regarding reproduced signals "A" and "B".

FIG. 12 shows first conditions where the sizes of the sync detection windows "A" and "B" are equal to the value 2M+1 corresponding to the odd number of clock periods. As shown in FIG. 12, each of the sync detection windows "A" and "B" is divided into a former portion having a width of M, a central portion having a width of "1", and a latter portion having a width of M. The former portion and the latter portion are symmetrical with respect to the central portion. In order to cause the end of the window "A" to precede the center of the window "B", the delay time L and the window-related partial width M are chosen to meet the following relation.

$$L \geq M+1 \qquad (1)$$

Figure 13:
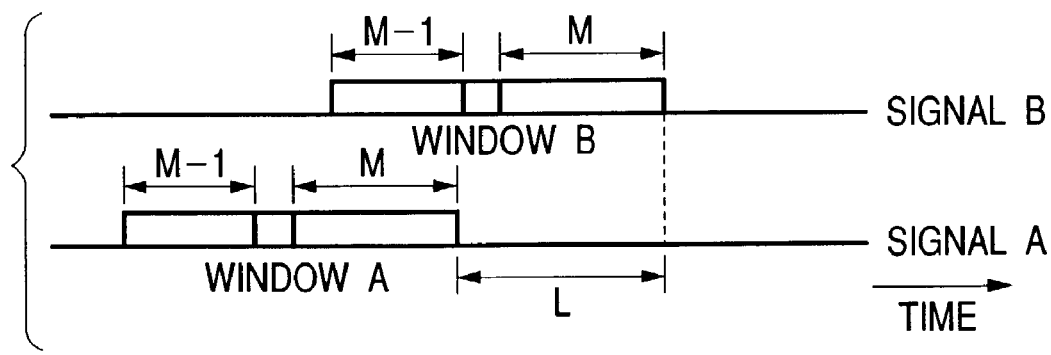
FIG. 13 is a time-domain diagram showing second conditions of sync detection windows "A" and "B" which are set regarding reproduced signals "A" and "B".

FIG. 13 shows second conditions where the sizes of the sync detection windows "A" and "B" are equal to the value 2M corresponding to the even number of clock periods. As shown in FIG. 13, each of the sync detection windows "A" and "B" is divided into a former portion having a width of M−1, a central portion having a width of "1", and a latter portion having a width of M. In order to cause the end of the window "A" to precede the center of the window "B", the delay time L and the window-related partial width M are chosen to meet the following relation.

$$L \geq M+1 \qquad (2)$$

Figure 14:
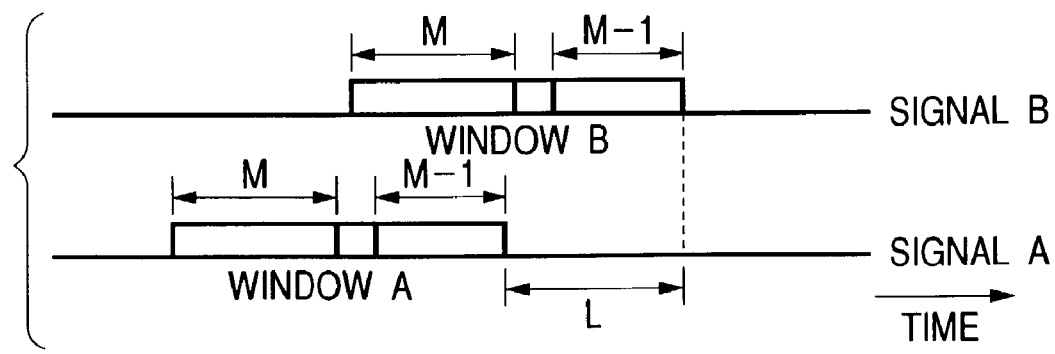
FIG. 14 is a time-domain diagram showing third conditions of sync detection windows "A" and "B" which are set regarding reproduced signals "A" and "B".

FIG. 14 shows third conditions where the sizes of the sync detection windows "A" and "B" are equal to the value 2M corresponding to the even number of clock periods. As shown in FIG. 14, each of the sync detection windows "A" and "B" is divided into a former portion having a width of M, a central portion having a width of "1", and a latter portion having a width of M−1. In order to cause the end of the window "A" to precede the center of the window "B", the delay time L and the window-related partial width M are chosen to meet the following relation.

$$L \geq M \qquad (3)$$

Preferably, the second decision circuit 25 includes a portion for estimating or predicting the time position of a forthcoming sync signal in the reproduced signal "B" from the time position of the latest sync signal and the prescribed number of clock periods (the time interval between adjacent frames). The time position of the central portion in the sync detection window "B" is set coincident with the predicted time position (the estimated time position) of a related sync signal in the reproduced signal "B". Provided that the delay time L and the sizes of the sync detection windows "A" and "B" are chosen to meet the previously-indicated relation ①, ②, or ③, the end of the window "A" precedes the predicted time position of the sync signal in the reproduced signal "B", that is, the time position of the center of the window "B".

As previously mentioned, the first decision circuit 22 determines whether or not the time position of the sync detection flag "A" is in the sync detection window "A". The first decision circuit 22 notifies a pseudo sync generator 26 of the result of the determination.

As previously mentioned, the second decision circuit 25 determines whether or not the time position of the sync detection flag "B" is in the sync detection window "B". The second decision circuit 25 notifies the pseudo sync generator 26 of the result of the determination. Furthermore, the second decision circuit 25 informs the pseudo sync generator 26 when the present time reaches the predicted time position of a sync signal to be detected in the sync detection window "B". In the case where the time position of the sync detection flag "B" is in the sync detection window "B" as shown in FIG. 11, the second decision circuit 25 outputs the sync detection flag "B" as formal one. The formal sync detection flag is sent from the second decision circuit 25 to the later-stage ECC circuit or the reproducing circuit 19 (see FIG. 7) via an OR circuit 27.

During operation of the sync signal detector 13A in the inertia mode, when the present time reaches the predicted time position of a sync signal to be detected in the sync detection window "B", the pseudo sync generator 26 refers to the determination results notified by the first and second decision circuits 22 and 25 and thereby decides whether or not sync detection flags "A" and "B" are in the sync detection windows "A" and "B". In the case where sync detection flags "A" and "B" continue to be absent from the sync detection windows "A" and "B", the pseudo sync generator 26 repetitively generates and outputs a pseudo sync signal at a moment corresponding to the predicted time position of a sync signal in the sync detection window "B". In this case, the pseudo sync generator 26 implements a limiting action as follows. The number of times the pseudo sync signal is generated and outputted consecutively for frames is limited to a predetermined value. In the case where a sync detection flag "A" is in the sync detection window "A" while a sync detection flag "B" is absent from the sync detection window "B", the pseudo sync generator 26 does not output a pseudo sync signal even at and after the predicted position of a sync signal in the reproduced signal "B". The pseudo sync signal is sent from the pseudo sync generator 26 to the later-stage ECC circuit or the reproducing circuit 19 (see FIG. 7) via the OR circuit 27. The pseudo sync signal is similar in waveform to the formal sync detection flag outputted from the second decision circuit 25.

During operation of the sync signal detector 13A in the inertia mode, only when a detected sync signal is absent from a corresponding sync signal detection window "A", the pseudo sync generator 26 inserts a pseudo sync signal in the sync detection flag train at a time position coincident with the predicted position (the estimated position) of a sync signal in the reproduced signal "B". The number of times the pseudo sync signal is inserted consecutively for frames is limited to the predetermined value. As previously mentioned, the predicted position of a sync signal in the reproduced signal "B" is given in response to the time position of the latest sync signal and the prescribed number of clock periods (the time interval between adjacent frames). In the case where a sync signal is detected in a corresponding sync detection window "A", the pseudo sync generator 26 does not insert a pseudo sync signal even at and after the predicted position of a sync signal in the reproduced signal "B". Therefore, it is unnecessary for the later-stage ECC circuit or the reproducing circuit 19 (see FIG. 7) to discriminate between an ordinary sync signal and a pseudo sync signal.

Third Embodiment

An information reproducing apparatus in a third embodiment of this invention is similar to that in the second embodiment of this invention except for design changes mentioned hereafter. The apparatus in the third embodiment of this invention includes a sync signal detector 13B instead of the sync signal detector 13A (see FIG. 10).

Figure 15:
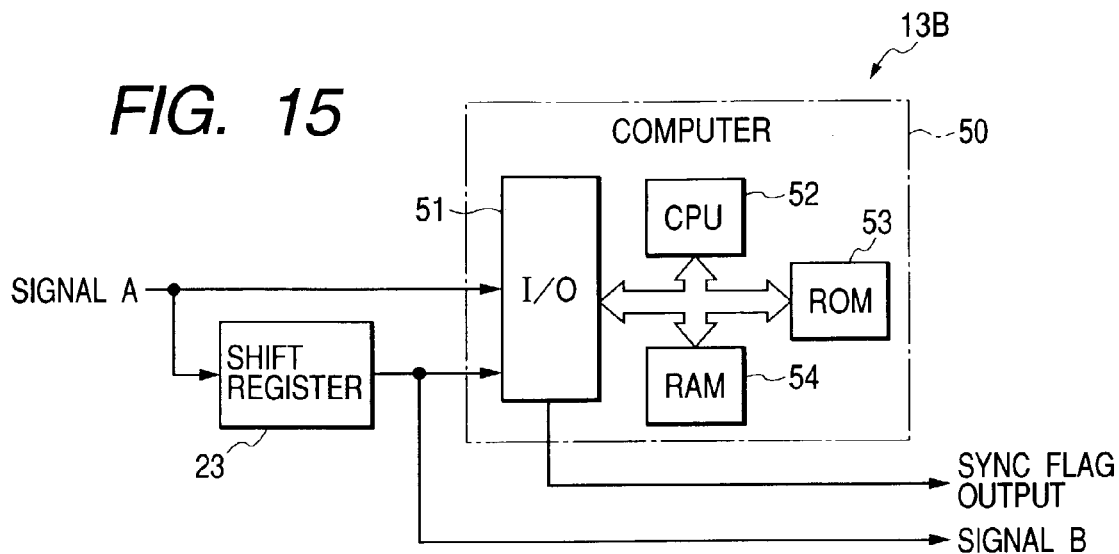
FIG. 15 is a block diagram of a sync signal detector in an information reproducing apparatus according to a third embodiment of this invention.

FIG. 15 shows a portion of the sync signal detector 13B. As shown in FIG. 15, the sync signal detector 13B includes a shift register 23 and a computer 50. The shift register 23 is similar to that in FIG. 10. The computer 50 has a combination of an input/output port 51, a CPU 52, a ROM 53, and a RAM 54. The computer 50 operates in accordance with a control program stored in the ROM 53 or the RAM 54. The computer 50 may be replaced by a digital signal processor or a similar programmable device.

The computer 50 receives the reproduced signal "A" from the optical head 12 (see FIG. 7). The computer 50 receives the reproduced signal "B" from the shift register 23. The computer 50 generates sync detection flags in response to the reproduced signals "A" and "B". The generated sync detection flags include ones of an ordinary type (a formal type) and ones of a pseudo type. The sync detection flags are sent from the computer 50 to the later-stage ECC circuit or the reproducing circuit 19 (see FIG. 7).

The computer 50 corresponds to the combination of the sync detection circuit 21, the first decision circuit 22, the sync detection circuit 24, the second decision circuit 25, the pseudo sync generator 26, and the OR circuit 27 in FIG. 10.

Figure 16:
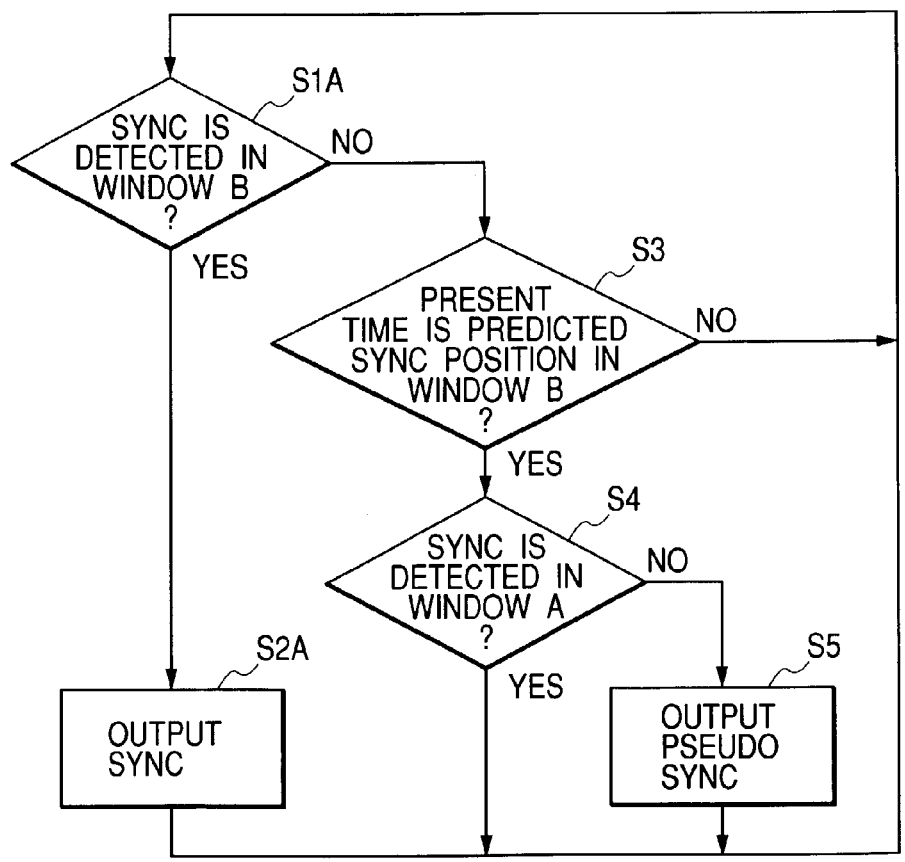
FIG. 16 is a flowchart of a segment of a control program for a computer in FIG. 15.

FIG. 16 is a flowchart of a segment of the control program for the computer 50 which is executed during operation of the sync signal detector 13B in the inertia mode.

As shown in FIG. 16, a first step S1A of the program segment decides whether or not a sync signal in the reproduced signal "B" is detected within a corresponding sync detection window "B". When a sync signal is detected in the window "B", the program advances from the step S1A to a step S2A. Otherwise, the program advances from the step S1A to a step S3.

The step S2A outputs a sync detection flag (a formal sync detection flag or an ordinary sync detection flag) in accordance with the detected sync signal in the window "B". After the step S2A, the program returns to the step S1A.

The step S3 decides whether or not the present time reaches the predicted time position of a sync signal to be detected in the sync detection window "B". When the present time reaches the predicted time position of a sync signal to be detected in the window "B", the program advances from the step S3 to a step S4. Otherwise, the program returns from the step S3 to the step S1A.

The step S4 decides whether or not a sync signal in the reproduced signal "A" is detected within a corresponding sync detection window "A". When a sync signal is detected in the window "A", the program returns from the step S4 to the step S1A. Otherwise, the program advances from the step S4 to a step S5.

The step S5 outputs a pseudo sync signal (a pseudo sync detection flag) at a time position coincident with the predicted position of a sync signal in the reproduced signal "B". After the step S5, the program returns to the step S1A.

The step S5 implements a limiting action as follows. The step S5 calculates the number of times the pseudo sync signal is outputted consecutively for frames. The step S5 compares the calculated number of times with a predetermined value. When the calculated number of times exceeds the predetermined value, the step S5 inhibits the pseudo sync signal from being outputted. Otherwise, the step S5 allows the pseudo sync signal to be outputted.

Fourth Embodiment

An information reproducing apparatus in a fourth embodiment of this invention is similar to that in the second embodiment of this invention except for design changes mentioned hereafter. The apparatus in the fourth embodiment of this invention includes a sync signal detector 13D instead of the sync signal detector 13A (see FIG. 10).

Figure 17:
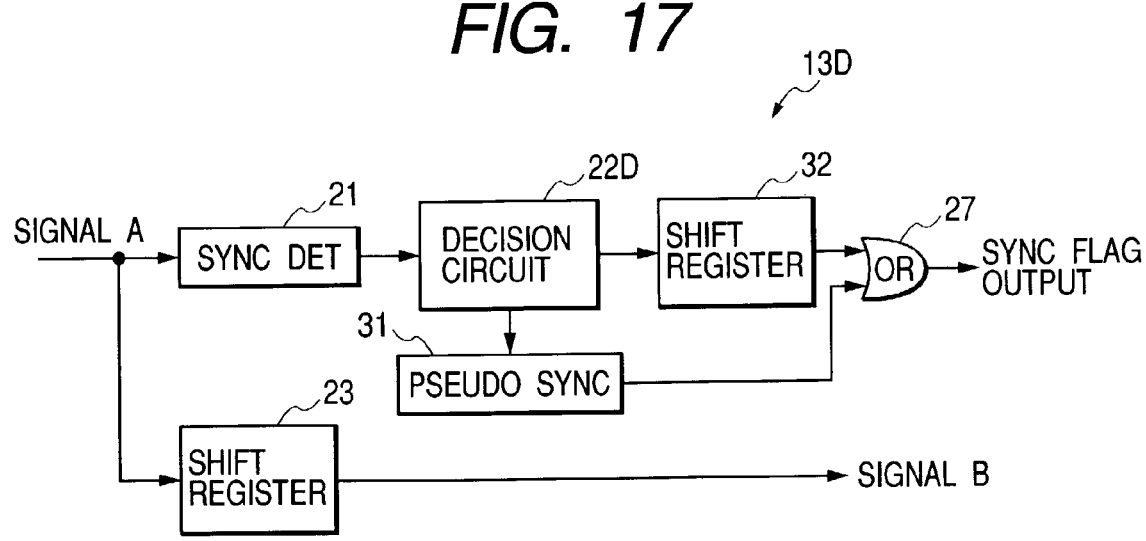
FIG. 17 is a block diagram of a sync signal detector in an information reproducing apparatus according to a fourth embodiment of this invention.

FIG. 17 shows a portion of the sync signal detector 13D. As shown in FIG. 17, the sync signal detector 13D includes a sync detection circuit 21, a shift register 23, and an OR circuit 27 which are similar to those in FIG. 10. The sync signal detector 13D further includes a decision circuit 22D, a pseudo sync generator 31, and a shift register 32. The decision circuit 22D corresponds to the first decision circuit 22 in FIG. 10.

Upon the detection of each sync signal in the reproduced signal "A", the sync detection circuit 21 outputs a sync detection flag "A" to the decision circuit 22D.

During operation of the sync signal detector 13D in the inertia mode, the decision circuit 22D is informed of a sync detection window "A" generated on the basis of the reproduced signal "A". The decision circuit 22D may have a portion for generating the sync detection window "A" in response to the reproduced signal "A". The decision circuit 22D determines whether or not the time position of the sync detection flag "A" is in the sync detection window "A". When the time position of the sync detection flag "A" is in the sync detection window "A", the decision circuit 22D passes the sync detection flag "A" to the shift register 32. Otherwise, the decision circuit 22D does not pass the sync detection flag "A" to the shift register 32. The shift register 32 delays the sync detection flag "A" by a predetermined time equal to the delay time provided by the shift register 23, and thereby gets a sync detection flag "B" having a correct timing relation with the reproduced signal "B" outputted from the shift register 23. The sync detection flag "B" is sent from the shift register 32 to the later-stage ECC circuit or the reproducing circuit 19 (see FIG. 7) via the OR circuit 27.

As previously mentioned, the decision circuit 22D determines whether or not the time position of the sync detection flag "A" is in the sync detection window "A". The decision circuit 22D notifies the pseudo sync generator 31 of the result of the determination.

When the determination result notified by the decision circuit 22D indicates that a sync signal in the reproduced signal "A" is not detected in a corresponding sync detection window "A", the pseudo sync generator 31 produces a pseudo sync signal (a pseudo sync detection flag). On the other hand, when the determination result indicates that a sync signal in the reproduced signal "A" is detected in a corresponding sync detection window "A", the pseudo sync generator 31 does not produces a pseudo sync signal. The produced pseudo sync signal is sent from the pseudo sync generator 31 to the later-stage ECC circuit or the reproducing circuit 19 (see FIG. 7) via the OR circuit 27.

The pseudo sync generator 31 predicts the time position of each sync signal in the reproduced signal "B". The pseudo sync generator 31 temporally locates the produced pseudo sync signal at a time position coincident with the predicted time position of a sync signal in the reproduced signal "B".

It is unnecessary for the later-stage ECC circuit or the reproducing circuit 19 (see FIG. 7) to discriminate between an ordinary sync signal and a pseudo sync signal.

Fifth Embodiment

An information reproducing apparatus in a fifth embodiment of this invention is similar to that in the fourth embodiment of this invention except for design changes mentioned hereafter. The apparatus in the fourth embodiment of this invention includes a sync signal detector 13E instead of the sync signal detector 13D (see FIG. 17).

Figure 18:
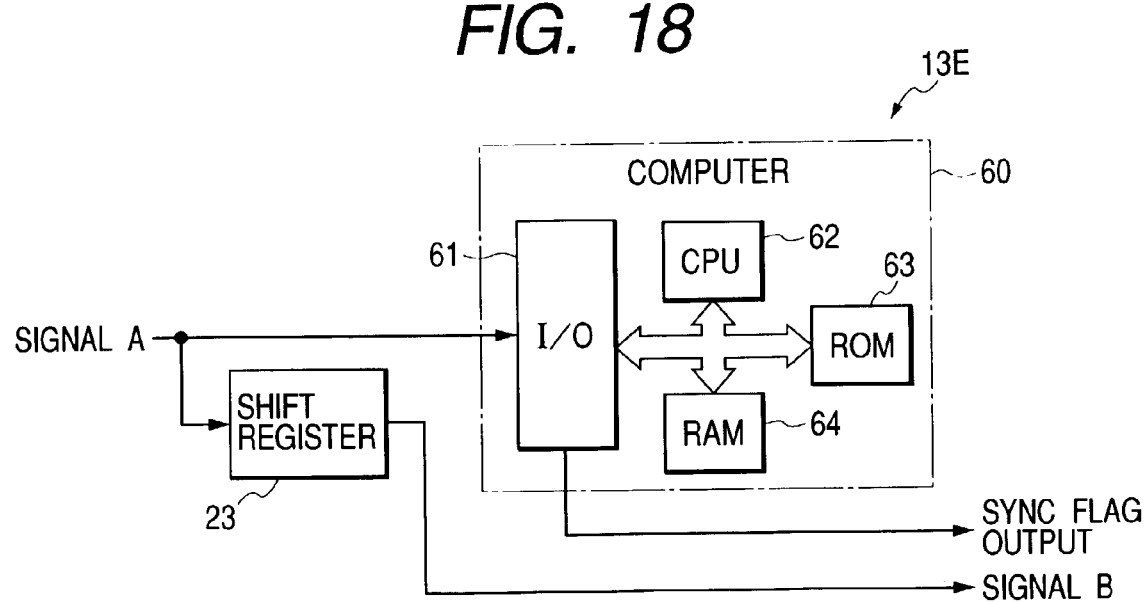
FIG. 18 is a block diagram of a sync signal detector in an information reproducing apparatus according to a fifth embodiment of this invention.

FIG. 18 shows a portion of the sync signal detector 13E. As shown in FIG. 18, the sync signal detector 13E includes a shift register 23 and a computer 60. The shift register 23 is similar to that in FIG. 17. The computer 60 has a combination of an input/output port 61, a CPU 62, a ROM 63, and a RAM 64. The computer 60 operates in accordance with a control program stored in the ROM 63 or the RAM 64. The computer 60 may be replaced by a digital signal processor or a similar programmable device.

The computer 60 receives the reproduced signal "A" from the optical head 12 (see FIG. 7). The computer 60 generates sync detection flags in response to the reproduced signal "A". The generated sync detection flags include ones of an ordinary type (a formal type) and ones of a pseudo type. The sync detection flags are sent from the computer 60 to the later-stage ECC circuit or the reproducing circuit 19 (see FIG. 7).

The computer 60 corresponds to the combination of the sync detection circuit 21, the decision circuit 22D, the OR circuit 27, the pseudo sync generator 31, and the shift register 32 in FIG. 17.

Figure 19:
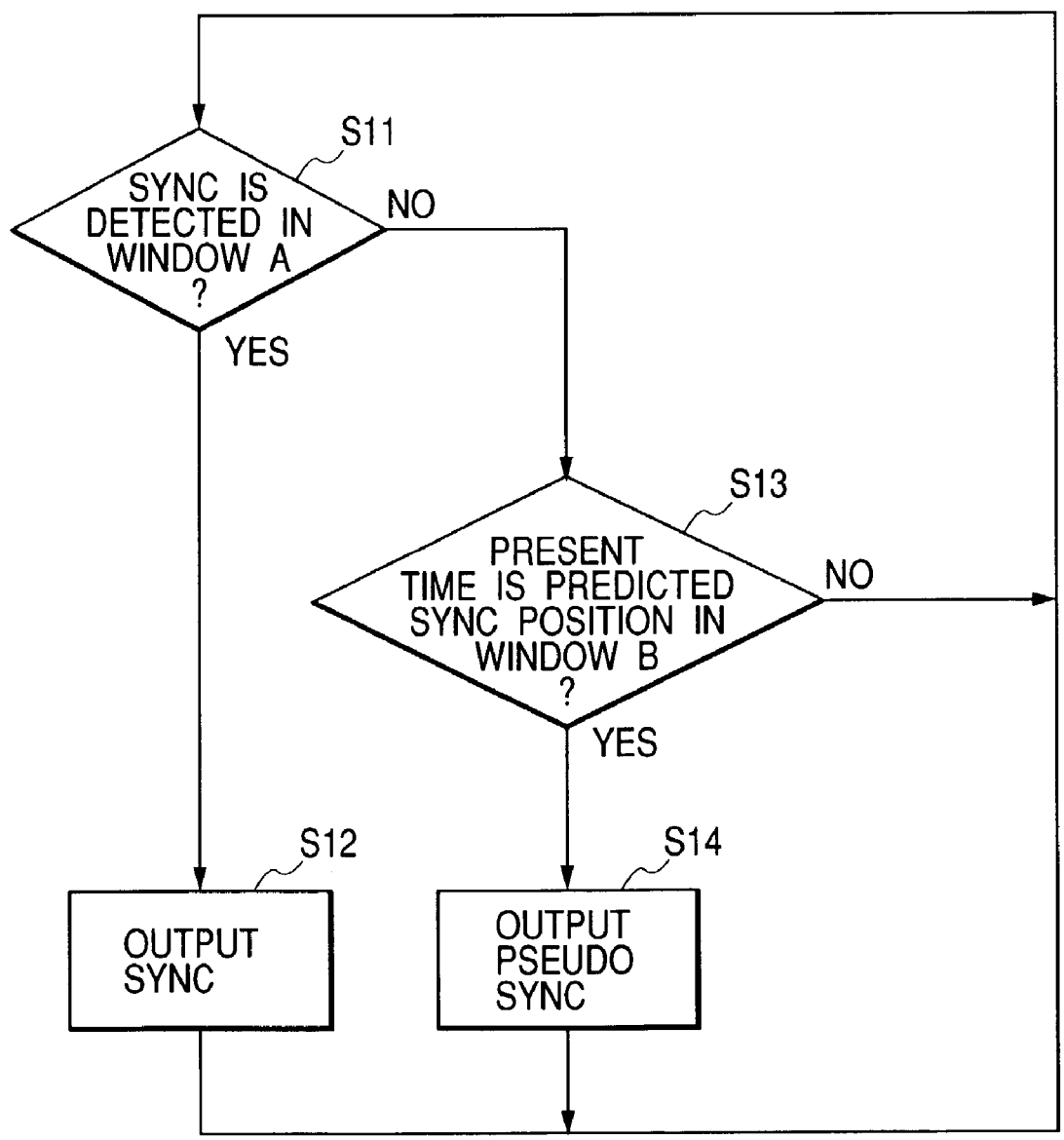
FIG. 19 is a flowchart of a segment of a control program for a computer in FIG. 18.

FIG. 19 is a flowchart of a segment of the control program for the computer 60 which is executed during operation of the sync signal detector 13E in the inertia mode.

As shown in FIG. 19, a first step S11 of the program segment decides whether or not a sync signal in the reproduced signal "A" is detected within a corresponding sync detection window "A". When a sync signal is detected in the window "A", the program advances from the step S11 to a step S12. Otherwise, the program advances from the step S11 to a step S13.

The step S12 outputs a sync detection flag (a formal sync detection flag or an ordinary sync detection flag) in response to the detected sync signal in the window "A". The step S12 controls the sync detection flag to be in a correct timing relation with the reproduced signal "B". After the step S12, the program returns to the step S1.

The step S13 decides whether or not the present time reaches the predicted time position of a sync signal in the reproduced signal "B". When the present time reaches the predicted time position of a sync signal in the reproduced signal "B", the program advances from the step S13 to a step S14. Otherwise, the program returns from the step S13 to the step S11.

The step S14 outputs a pseudo sync signal (a pseudo sync detection flag) at a time position coincident with the predicted position of a sync signal in the reproduced signal "B". After the step S14, the program returns to the step S11.

The step S14 implements a limiting action as follows. The step S14 calculates the number of times the pseudo sync signal is outputted consecutively for frames. The step S14 compares the calculated number of times with a predetermined value. When the calculated number of times exceeds the predetermined value, the step S14 inhibits the pseudo sync signal from being outputted. Otherwise, the step S14 allows the pseudo sync signal to be outputted.

Sixth Embodiment

Figure 20:
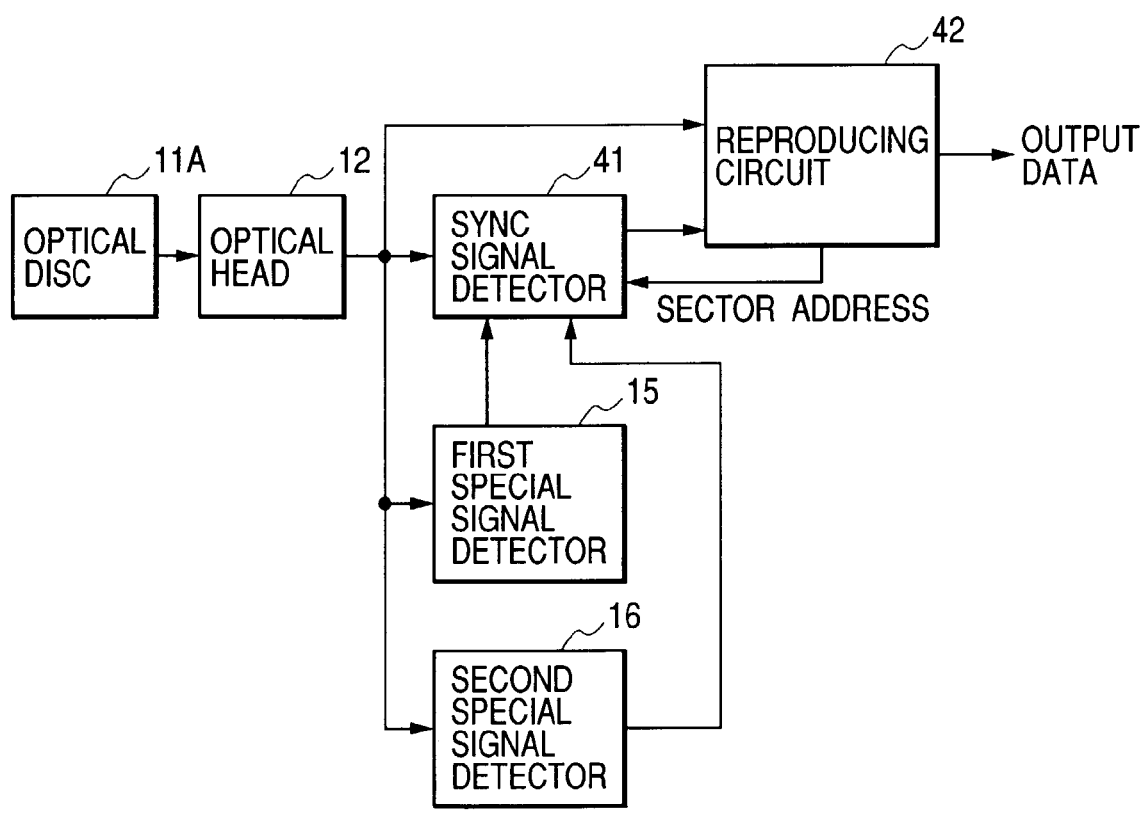
FIG. 20 is a block diagram of an information reproducing apparatus according to a sixth embodiment of this invention.

FIG. 20 shows an information reproducing apparatus according to a sixth embodiment of this invention. The apparatus of FIG. 20 is similar to that of FIG. 7 except for design changes mentioned hereafter.

The apparatus of FIG. 20 operates on an optical disc 11A. The optical disc 11A stores an information signal as the optical disc 11 (see FIG. 7) does. The information signal recorded on the optical disc 11A contains a signal representing the logical or physical addresses (serial numbers) of sectors in the information signal.

The apparatus in FIG. 20 includes a sync signal detector 41 and a reproducing circuit 42 instead of the sync signal detector 13 and the reproducing circuit 19 (see FIG. 7). The apparatus of FIG. 20 does not have the special pattern detector 14, the counter 17, and the specified-position deciding section 18 (see FIG. 7).

With reference to FIG. 20, the optical head 12 reads the information signal from the optical disc 11A, and generates the resultant signal referred to as the reproduced signal. The optical head 12 feeds the reproduced signal to the first-special-signal detector 15, the second-special-signal detector 16, the sync signal detector 41, and the reproducing circuit 42.

The sync signal detector 41 functions to detect every sync signal in the reproduced signal. The sync signal detector 41 can operate in either a direct detection mode or an inertia mode. During the direct detection mode of operation, the device 41 detects sync signals on a pattern-search basis. During the inertia mode of operation, the device 41 detects sync signals while periodically setting a sync detection window at time intervals corresponding to the prescribed number of clock periods. The sync signal detector 41 uses sync signals detected in sync detection windows as effective ones or correct ones, and neglects sync signals detected outside the sync detection windows. The sync signal detector 41 outputs the correct sync signals to the reproducing circuit 42.

During the inertia mode of operation, the sync signal detector 41 can generate pseudo sync signals under given conditions. The sync signal detector 41 outputs the pseudo sync signals to the reproducing circuit 42 as correct sync signals.

The reproducing circuit 42 uses the correct sync signals in extracting data from the reproduced signal and decoding the extracted data. In other words, the reproducing circuit 42 recovers original information (original data) from the reproduced signal in response to the correct sync signals. The reproducing circuit 42 includes, for example, an ECC circuit and other circuits. The reproducing circuit 42 extracts the sector address signal from the reproduced signal in response to the correct sync signals. The reproducing circuit 42 feeds the sector address signal to the sync signal detector 41.

The sync signal detector 41 changes its operation between the direct detection mode and the inertia mode in response to the sector address signal. The sync signal detector 41 gets, from the sector address signal, information about a specified position immediately after the last frame (the frame "n−1") in the last sector (the sector "m−1") of the current ECC block. The sync signal detector 41 utilizes the specified position in controlling the change of its operation between the direct detection mode and the inertia mode.

Figure 21:
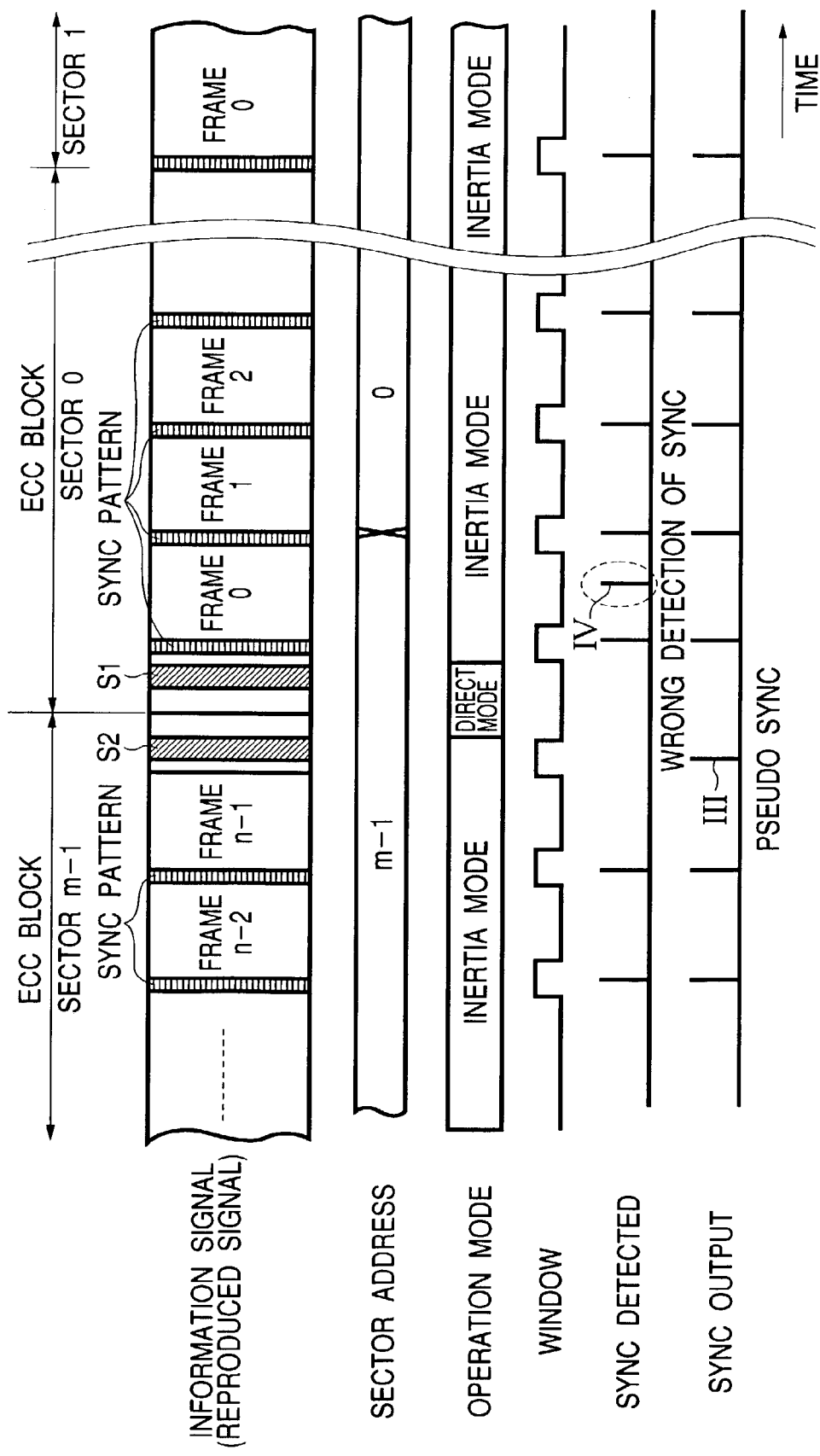
FIG. 21 is a time-domain diagram of a reproduced signal, the mode of operation of a sync signal detector, and various signals which occur during the reproduction of an information signal in the information reproducing apparatus of FIG. 20.

FIG. 21 shows the condition of a portion of the information signal which extends at and around the boundary of two adjacent ECC blocks. In FIG. 21, the information signal is illustrated as a reproduced signal. FIG. 21 also shows the mode of operation of the sync signal detector 41 during the reproduction of the information signal. FIG. 21 further shows the conditions of various signals occurring in the apparatus of FIG. 20 during the reproduction of the information signal.

With reference to FIG. 21, the address value indicated by the sector address signal fed to the sync signal detector 41 from the reproducing circuit 42 increments as the sector in the reproduced signal (the information signal) is updated from one to another. The sector address signal changes from "0" to "m−1" for each ECC block. The sector address signal is reset to "0" in synchronism with the start or the end of each ECC block. The sector address signal being "m−1" denotes that the current sector is last one in each ECC block.

The second special signal S2 exists in a place immediately after the last frame (the frame "n−1") in the last sector (the sector "m−1") of each ECC block. The second-special-signal detector 16 receives the reproduced signal from the optical head 12. The device 16 detects each second special signal S2 in the reproduced signal. Upon the detection of each second special signal S2, the second-special-signal detector 16 outputs a corresponding detection flag to the sync signal detector 41.

As shown in FIG. 21, in the case where a detection flag for the second special signal S2 is fed from the second-special-signal detector 16 when the sector address signal is "m−1" and hence denotes that the current sector is last one in the ECC block, the sync signal detector 41 changes its operation from the inertia mode to the direct detection mode.

The first special signal S1 exists in a place immediately before the first frame (the frame "0") in the first sector (the sector "0") of each ECC block. The first-special-signal detector 15 receives the reproduced signal from the optical head 12. The device 15 detects each first special signal S1 in the reproduced signal. Upon the detection of each first special signal S1, the first-special-signal detector 15 outputs a corresponding detection flag to the sync signal detector 41.

As shown in FIG. 21, the sync signal detector 41 changes its operation from the direct detection mode to the inertia mode in response to a detection flag for the first special signal S1 which is fed from the first-special-signal detector 15.

Operation of the sync signal detector 41 is changed from the inertia mode to the direct detection mode at a timing which corresponds to a position in an end portion of each ECC block. Therefore, data in a head portion of a next ECC block can be correctly recovered. In addition, the sync signal detector 41 can operate stably.

During operation in the inertia mode, the sync signal detector 41 sets formal sync detection windows (see FIG. 21). The sync signal detector 41 uses sync signals detected in the formal sync detection windows. The sync signals detected in the formal sync detection windows are outputted from the sync signal detector 41 to the reproducing circuit 42 as correct ones (effective ones). The sync signal detector 41 neglects sync signals detected outside the formal sync detection windows. As shown in FIG. 21, during operation in the inertia mode, the sync signal detector 41 outputs a pseudo sync signal III in the absence of a sync signal detected in a corresponding formal sync detection window.

It is possible to prevent the timing of operation change to the inertia mode from being delayed by wrong detection of a sync signal after operation of the sync signal detector 41 changes to the direct detection mode for an end portion of each ECC block. The sync signal detector 41 operates in the inertia mode from a timing which is immediately before or coincident with the start of the first frame (the frame "0") in the first sector (the sector "0") of each ECC block. In the case where wrong detection of a sync signal IV outside formal sync detection windows occurs at a moment corresponding to a place within the first frame (the frame "0") in the first sector (the sector "0") of an ECC block as shown in FIG. 21, the sync signal detector 41 prevents the wrong sync signal IV from being outputted as correct one since the wrong sync signal IV is outside the formal sync detection windows. Therefore, data in a head portion of each ECC block can be correctly recovered.

Seventh Embodiment

Figure 22:
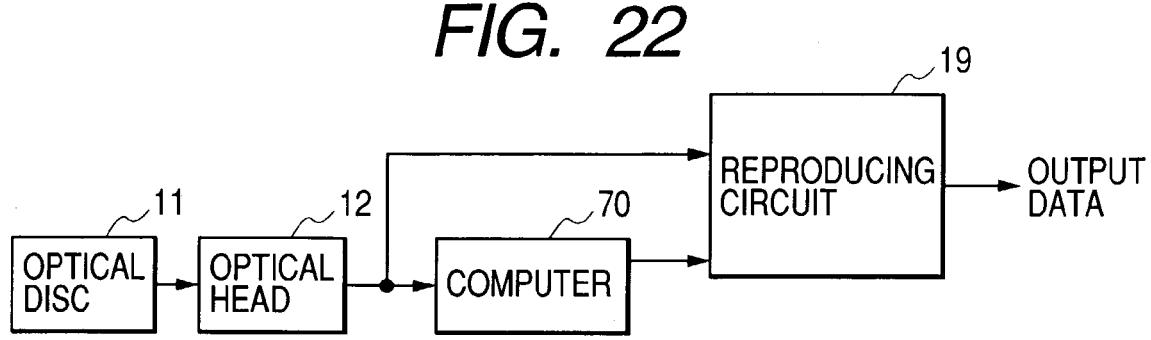
FIG. 22 is a block diagram of an information reproducing apparatus according to a seventh embodiment of this invention.

FIG. 22 shows an information reproducing apparatus according to a seventh embodiment of this invention. The apparatus of FIG. 22 is similar to that of FIG. 7 except for design changes mentioned hereafter.

The apparatus of FIG. 22 includes a computer 70 which corresponds to the combination of the sync signal detector 13, the special pattern detector 14, the first-special-signal detector 15, the second-special-signal detector 16, the counter 17, and the specified-position deciding section 18 in FIG. 7. The computer 70 has a combination of an input/output port, a CPU, a ROM, and a RAM. The computer 70 operates in accordance with a control program stored in the ROM or the RAM.

The computer 70 receives the reproduced signal from the optical head 12. The computer 70 detects sync signals in the reproduced signal. The computer 70 outputs the detected sync signals to the reproducing circuit 19. Sync detecting operation of the computer 70 is in either a direct detection mode or an inertia mode. During sync detecting operation in the direct detection mode, the computer 70 detects sync signals in the reproduced signal while periodically setting a sync detection window. The computer 70 uses the detected sync signals in the sync detection windows as correct ones (effective ones). The computer 70 outputs the correct sync signals to the reproducing circuit 19. On the other hand, the computer 70 neglects the detected sync signals outside the sync detection windows. During sync detecting operation in the inertia mode, the computer 70 generates pseudo sync signals in response to the reproduced signal under given conditions. The computer 70 outputs the pseudo sync signals to the reproducing circuit 19.

Figure 23:
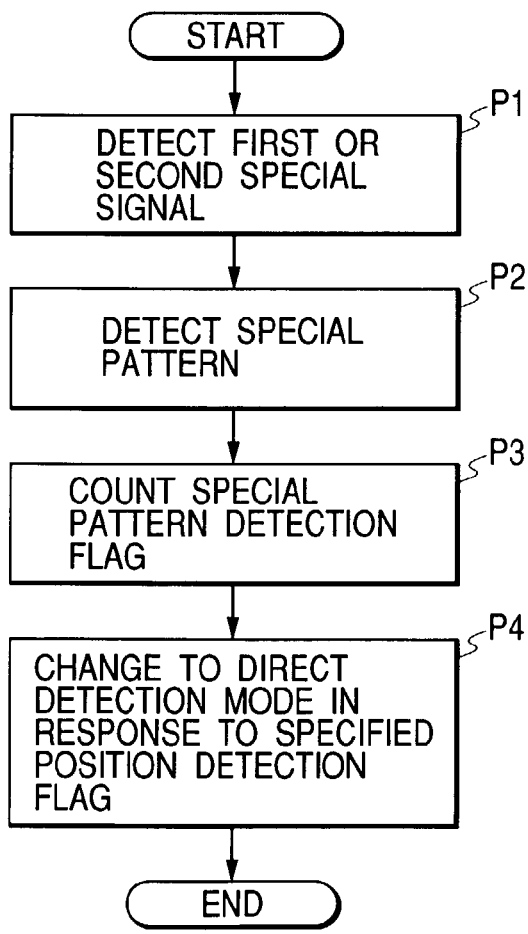
FIG. 23 is a flowchart of a segment of a control program for a computer in FIG. 22.

FIG. 23 is a flowchart of a segment of the control program for the computer 70. The program segment in FIG. 23 is repetitively executed.

As shown in FIG. 23, a first step P1 of the program segment detects each first special signal S1 in the reproduced signal. Upon the detection of each first special signal S1, the step P1 generates a corresponding detection flag. The step P1 detects each second special signal S2 in the reproduced signal. Upon the detection of each second special signal S2, the step P1 generates a corresponding detection flag. The step P1 corresponds to the first-special-signal detector 15 and the second-special-signal detector 16 in FIG. 7.

A step P2 following the step P1 detects the special pattern signal in the reproduced signal. A first example of the special pattern signal is the sync signal in the first frame of each sector which has the predetermined pattern SY0. A second example of the special pattern signal is the set of two or more successive sync signals having serial ones among the predetermined patterns SY0–SY9. As previously mentioned, such a set of two or more successive sync signals is only one in each sector. Upon the detection of every special pattern signal, the step P2 generates a corresponding detection flag. The step P2 corresponds to the special pattern detector 14 in FIG. 7.

A step P3 subsequent to the step P2 counts every detection flag for the special pattern signal which is generated by the step P2. The resultant count number given by the step P3 increments as the sector in the reproduced signal is updated from one to another. Thus, the count number given by the step P3 means a sector count number. The step P3 resets the sector count number to "0" in response to every detection flag for the first special signal S1. The step P3 corresponds to the counter 17 in FIG. 7.

A step P4 following the step P3 decides whether or not a detection flag for the second special signal S2 is generated when the sector count number is "m" and hence denotes that the current sector is last one in the ECC block. In the case where a detection flag for the second special signal S2 is generated when the sector count number is "m", the step P4 generates a specified-position detection flag. The step P4 changes sync detecting operation of the computer 70 from the inertia mode to the direct detection mode in response to the specified-position detecting flag. The step P4 corresponds to the sync signal detector 13 and the specified-position deciding section 18 in FIG. 7. After the step P4, the current execution cycle of the program segment ends.

Sync detecting operation of the computer 70 is changed from the inertia mode to the direct detection mode at a timing which corresponds to a position in an end portion of each ECC block. Therefore, data in a head portion of a next ECC block can be correctly recovered. In addition, the computer 70 can stably implement the sync detection.

Eighth Embodiment

Figure 24:
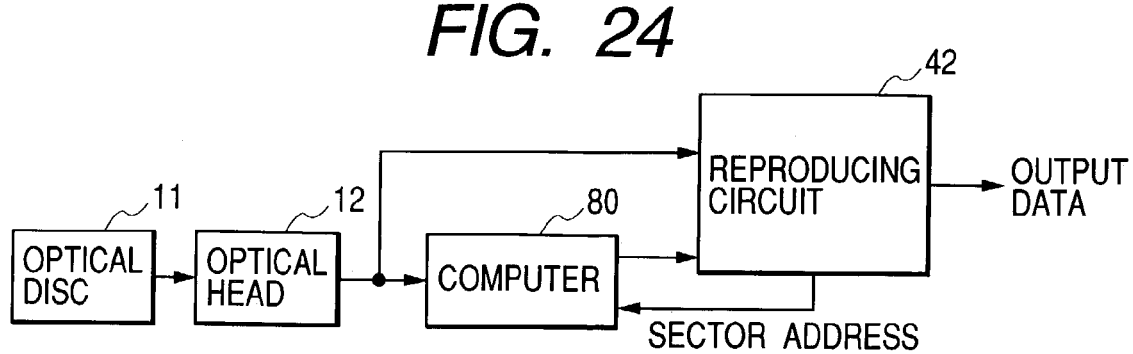
FIG. 24 is a block diagram of an information reproducing apparatus according to an eighth embodiment of this invention.

FIG. 24 shows an information reproducing apparatus according to an eighth embodiment of this invention. The apparatus of FIG. 24 is similar to that of FIG. 20 except for design changes mentioned hereafter.

The apparatus of FIG. 24 includes a computer 80 which corresponds to the combination of the first-special-signal detector 15, the second-special-signal detector 16, and the sync signal detector 41 in FIG. 20. The computer 80 has a combination of an input/output port, a CPU, a ROM, and a RAM. The computer 80 operates in accordance with a control program stored in the ROM or the RAM.

The computer 80 receives the reproduced signal from the optical head 12. The computer 80 detects sync signals in the reproduced signal. The computer 80 outputs the detected sync signals to the reproducing circuit 42. Sync detecting operation of the computer 80 is in either a direct detection mode or an inertia mode. During sync detecting operation in the direct detection mode, the computer 80 detects sync signals in the reproduced signal while periodically setting a sync detection window. The computer 80 uses the detected sync signals in the sync detection windows as correct ones (effective ones). The computer 80 outputs the correct sync signals to the reproducing circuit 42. On the other hand, the computer 80 neglects the detected sync signals outside the sync detection windows. During sync detecting operation in the inertia mode, the computer 80 generates pseudo sync signals in response to the reproduced signal under given conditions. The computer 80 outputs the pseudo sync signals to the reproducing circuit 42.

The computer 80 receives the sector address signal from the reproducing circuit 42. The computer 80 changes its sync detecting operation between the direct detection mode and the inertia mode in response to the sector address signal. The computer 80 gets, from the sector address signal, information about a specified position immediately after the last frame (the frame "n−1") in the last sector (the sector "m−1") of the current ECC block. The computer 80 utilizes the specified position in controlling the change of its sync detecting operation between the direct detection mode and the inertia mode.

Figure 25:
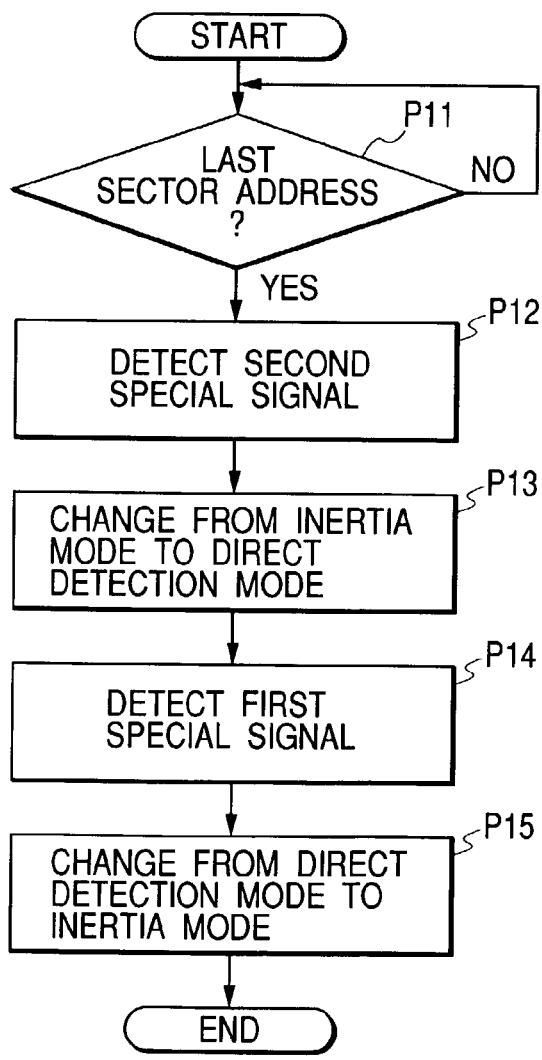
FIG. 25 is a flowchart of a segment of a control program for a computer in FIG. 24.

FIG. 25 is a flowchart of a segment of the control program for the computer 80. The program segment in FIG. 25 is repetitively executed.

As shown in FIG. 25, a first step P11 of the program segment decides whether or not the sector address signal reaches "m−1", that is, whether or not the sector address signal currently corresponds to the last sector in an ECC block. When the sector address signal reaches "m−1", that is, when the sector address signal currently corresponds to the last sector in an ECC block, the program advances from the step P11 to a step P12. Otherwise, the step P11 is repeated.

The step P12 tries to detect the second special signal S2 in the reproduced signal. When the detection of the second special signal S2 has succeeded, the program advances from the step P12 to a step P13. Otherwise, the program exits from the step P12, and then the current execution cycle of the program segment ends.

The step P13 changes sync detecting operation of the computer 80 from the inertia mode to the direct detection mode.

A step P14 following the step P13 tries to detect the first special signal S1 in the reproduced signal. When the detection of the first special signal S1 has succeeded, the program advances from the step P14 to a step P15. Otherwise, the program exits from the step P14, and then the current execution cycle of the program segment ends.

The step P15 changes sync detecting operation of the computer 80 from the direct detection mode to the inertia mode. After the step P15, the current execution cycle of the program segment ends.

Sync detecting operation of the computer 80 is changed from the inertia mode to the direct detection mode at a timing which corresponds to a position in an end portion of each ECC block. Therefore, data in a head portion of a next ECC block can be correctly recovered. In addition, the computer 80 can stably implement the sync detection.

Ninth Embodiment

An information reproducing apparatus in a ninth embodiment of this invention is similar to that in FIG. 20 except for design changes mentioned hereafter.

In the apparatus of the ninth embodiment of this invention, operation of the sync signal detector 41 is changed from the inertia mode to the direct detection mode at a timing a predetermined interval after the sector address signal indicates that the current sector is last one in an ECC block. Upon the detection of a sync signal corresponding to the head of the first frame in the first sector (the frame "0" in the sector "0") of an ECC block, operation of the sync signal detector 41 is changed from the direct detection mode to the inertia mode.

The apparatus in the ninth embodiment of this invention can correctly recover data from a head portion of each ECC block without using the first and second special signals S1 and S2. In addition, the sync signal detector 41 can operate stably.

Tenth Embodiment

An information reproducing apparatus in a tenth embodiment of this invention is similar to that in FIG. 24 except for design changes mentioned hereafter.

In the apparatus of the tenth embodiment of this invention, sync detecting operation of the computer 80 is changed from the inertia mode to the direct detection mode at a timing a predetermined interval after the sector address signal indicates that the current sector is last one in an ECC block. Upon the detection of a sync signal corresponding to the head of the first frame in the first sector (the frame "0" in the sector "0") of an ECC block, sync detecting operation of the computer 80 is changed from the direct detection mode to the inertia mode.

The apparatus in the tenth embodiment of this invention can correctly recover data from a head portion of each ECC block without using the first and second special signals S1 and S2. In addition, the computer 80 can stably implement the sync detection.

Eleventh Embodiment

An information reproducing apparatus in an eleventh embodiment of this invention is similar to that in one of the first to tenth embodiments of this invention except for the following design change.

The apparatus in the eleventh embodiment of this invention is designed to operate on a recording medium different from an optical disc.

Advantages Provided by the Invention

A portion of an information signal which extends at and around the boundary between ECC blocks has conditions as follows. The interval between the last sync signal in an ECC block and the first sync signal in a next ECC block differs from the normal value corresponding to the prescribed number of clock periods (the length of each frame). During the reproduction of the information signal, in the case where a detection flag for the second special signal S2 is generated when the sector count number is equal to "m", the present time is considered to be coincident with the specified position immediately preceding the start of a next ECC block. At the timing which corresponds to the specified position, operation of the sync signal detector is changed from the inertia mode to the direct detection mode. Thereby, the timing of change from the inertia mode to the direct detection mode is prevented from entering a time range corresponding to the first sector (the sector "0") in the next ECC block. Therefore, data in a head portion of the next ECC block can be correctly recovered. In addition, the sync signal detector can operate stably.

When a detection flag for the first special signal S1 is generated, operation of the sync signal detector is changed from the direct detection mode to the inertia mode. At the same time, the position of a sync detection window is reset to the predicted position of a sync signal in a first frame. Therefore, the direct detection mode of operation can be promptly replaced by the inertia mode of operation without executing useless steps such as a step of setting a sync detection window and a step of detecting a sync-signal continuity or a sync-signal seriality. The inertia mode of operation withstands wrong detection of sync signals better than the direct detection mode of operation does.

The reproduced signal "A" is delayed to get the reproduced signal "B". The time position of a sync signal in the reproduced signal "B" is estimated or predicted from the factors including the prescribed number of clock periods. During the inertia mode of operation, when a detected sync signal in the reproduced signal "A" is absent from a corresponding sync detection window, a pseudo sync signal is inserted in the detected sync train at a time position coincident with the estimated time position (the predicted time position) of a sync signal therein. The number of times the pseudo sync signal is inserted consecutively for frames is limited to the predetermined value. It is unnecessary for the later-stage ECC circuit or the reproducing circuit to discriminate between an ordinary sync signal and a pseudo sync signal.

A decision is made as to whether or not a sync signal in the reproduced signal "A" is detected in a corresponding sync detection window. During the inertia mode of operation, when it is decided that a sync signal in the reproduced signal "A" is not detected in a corresponding sync detection window, a pseudo sync signal is inserted in the detected sync train at a time position coincident with the estimated time position (the predicted time position) of a sync signal therein. The number of times the pseudo sync signal is inserted consecutively for frames is limited to the predetermined value. It is unnecessary to decide whether or not a sync signal in the reproduced signal "B" is detected in a corresponding sync detection window. Furthermore, it is unnecessary for the later-stage ECC circuit or the reproducing circuit to discriminate between an ordinary sync signal and a pseudo sync signal.

The information signal recorded on the optical disc contains the sector address signal. The information signal is reproduced from the optical disc so that the reproduced signal occurs. The sector address signal is extracted from the reproduced signal. In the case where the second special signal S2 is detected when the extracted sector address signal indicates that the current sector is last one in an ECC block, operation of the sync signal detector is changed from the inertia mode to the direct detection mode. It should be noted that operation of the sync signal detector may be changed to the direct detection mode at a timing the predetermined interval after the sector address signal indicates that the current sector is last one in an ECC block. Thereafter, upon the detection of the first special signal S1, operation of the sync signal detector is changed from the direct detection mode to the inertia mode. It should be noted that operation of the sync signal detector may be changed to the inertia mode when a sync signal in the first frame in the first sector of an ECC block is detected. Therefore, data in a head portion of the next ECC block can be correctly recovered. In addition, the sync signal detector can operate stably. Furthermore, the direct detection mode of operation can be promptly replaced by the inertia mode of operation without executing useless steps such as a step of setting a sync detection window and a step of detecting a sync-signal continuity or a sync-signal seriality. The inertia mode of operation withstands wrong detection of sync signals better than the direct detection mode of operation does.

Sync signals can be accurately extracted from the reproduced signal without using the first and second special signals S1 and S2. The reproduction of the information signal is stable.

What is claimed is:

1. An apparatus for detecting sync signals from a recording medium and reproducing information from the recording medium in response to the detected sync signals, the recording medium storing an information signal divided into a plurality of blocks each including "m" sectors, each of the sectors being divided into "n" frames having a length corresponding to a prescribed number of clock periods, "m" and "n" denoting natural numbers equal to or greater than 2, each of the frames including a sync signal having a pattern selected from 10 or less different patterns, each of the blocks including a first special signal in a position before a first sector, each of the blocks including a second special signal in a position after a last sector, the second special signal having a pattern equal to one of the different patterns for the sync signal, each of the sectors including a special pattern signal, the apparatus comprising:

first means for reading an information signal from a recording medium to generate a reproduced signal;

a sync signal detector for detecting a sync signal in the reproduced signal generated by the first means, the sync signal detector operating in either a direct detection mode or an inertia mode, the sync signal detector detecting the sync signal on a pattern search basis during operation in the direct detection mode, the sync signal detector setting a sync detection window in response to the prescribed number of clock periods and detecting the sync signal in the sync detection window during operation in the inertia mode;

second means for detecting a first special signal in the reproduced signal generated by the first means, and generating a first-special-signal detection flag upon detection of the first special signal;

third means for detecting a special pattern signal in the reproduced signal generated by the first means, and generating a special-pattern detection flag upon detection of the special pattern signal;

fourth means for detecting a second special signal in the reproduced signal generated by the first means, and generating a second-special-signal detection flag upon detection of the second special signal;

a counter for counting the special-pattern detection flag generated by the third means to generate a special-pattern count number, and resetting the special-pattern count number in response to the first-special-signal detection flag generated by the second means; and fifth means for generating a specified-position detection flag in cases where the second-special-signal detection flag is generated by the fourth means when the special-pattern count number generated by the counter is equal to the natural number "m";

wherein the sync signal detector changes its operation from the inertia mode to the direct detection mode when the specified-position detection flag is generated by the fifth means.

2. An apparatus as recited in claim 1, wherein the sync signal detector changes its operation from the direct detection mode to the inertia mode and sets a position of the sync detection window to a predicted position of a sync signal in a first frame when the first-special-signal detection flag is generated by the second means.

3. An apparatus as recited in claim 1, wherein the sync signal detector comprises:

a delay circuit for using the reproduced signal generated by the first means as a first reproduced signal and delaying the first reproduced signal to generate a second reproduced signal;

a first deciding section for deciding whether or not a sync signal in the first reproduced signal is in a first sync detection window;

a second deciding section for deciding whether or not a sync signal in the second reproduced signal is in a second sync detection window; and an outputting section for, in cases where the second deciding section decides that a sync signal in the second reproduced signal is in a second sync detection window when the sync signal detector operates in the inertia mode, outputting the sync signal in the second sync detection window, and for, in cases where the first deciding section decides that a sync signal in the first reproduced signal is not in a first sync detection window when the sync signal detector operates in the inertia mode, outputting a pseudo sync signal at a predicted position of a sync signal in the second reproduced signal.

4. An apparatus as recited in claim 1, wherein the sync signal detector comprises:

a delay circuit for using the reproduced signal generated by the first means as a first reproduced signal and delaying the first reproduced signal to generate a second reproduced signal;

a deciding section for deciding whether or not a sync signal in the first reproduced signal is in a first sync detection window; and an outputting section for, in cases where the deciding section decides that a sync signal in the first reproduced signal is in a first sync detection window when the sync signal detector operates in the inertia mode, delaying the sync signal in the first sync detection window to generate a delay-resultant sync signal and outputting the delay-resultant sync signal, and for, in cases where the deciding section decides that a sync signal in the first reproduced signal is not in a first sync detection window when the sync signal detector operates in the inertia mode, outputting a pseudo sync signal at a predicted position of a sync signal in the second reproduced signal.

5. An apparatus for detecting sync signals from a recording medium and reproducing information from the recording medium in response to the detected sync signals, the recording medium storing an information signal divided into a plurality of blocks each including "m" sectors, each of the sectors being divided into "n" frames having a length corresponding to a prescribed number of clock periods, "m" and "n" denoting natural numbers equal to or greater than 2, each of the frames including a sync signal having a pattern selected from 10 or less different patterns, each of the blocks including a first special signal in a position before a first sector, each of the blocks including a second special signal in a position after a last sector, the second special signal having a pattern equal to one of the different patterns for the sync signal, the information signal including a sector address signal, the apparatus comprising:

first means for reading an information signal from a recording medium to generate a reproduced signal;

a sync signal detector for detecting a sync signal in the reproduced signal generated by the first means, the sync signal detector operating in either a direct detection mode or an inertia mode, the sync signal detector detecting the sync signal on a pattern search basis during operation in the direct detection mode, the sync signal detector setting a sync detection window in response to the prescribed number of clock periods and detecting the sync signal in the sync detection window during operation in the inertia mode;

second means for extracting a sector address signal from the reproduced signal generated by the first means;

third means for detecting a first special signal in the reproduced signal generated by the first means, and generating a first-special-signal detection flag upon detection of the first special signal; and fourth means for detecting a second special signal in the reproduced signal generated by the first means, and generating a second-special-signal detection flag upon detection of the second special signal;

wherein the sync signal detector changes its operation from the inertia mode to the direct detection mode in cases where the second-special-signal detection flag is generated by the fourth means when the sector address signal extracted by the second means denotes a last sector in a block, and the sync signal detector changes its operation from the direct detection mode to the inertia mode when the first-special-signal detection flag is generated by the third means.

6. An apparatus for detecting sync signals from a recording medium and reproducing information from the recording medium in response to the detected sync signals, the recording medium storing an information signal divided into a plurality of blocks each including "m" sectors, each of the sectors being divided into "n" frames having a length corresponding to a prescribed number of clock periods, "m" and "n" denoting natural numbers equal to or greater than 2, each of the frames including a sync signal having a pattern selected from 10 or less different patterns, each of the sectors including a special pattern signal, the information signal including a sector address signal, the apparatus comprising:

first means for reading an information signal from a recording medium to generate a reproduced signal;

a sync signal detector for detecting a sync signal in the reproduced signal generated by the first means, the sync signal detector operating in either a direct detection mode or an inertia mode, the sync signal detector detecting the sync signal on a pattern search basis during operation in the direct detection mode, the sync signal detector setting a sync detection window in response to the prescribed number of clock periods and detecting the sync signal in the sync detection window during operation in the inertia mode;

second means for extracting a sector address signal from the reproduced signal generated by the first means;

third means for detecting a special pattern signal in the reproduced signal generated by the first means, and generating a special-pattern detection flag upon detection of the special pattern signal;

a counter for counting the special-pattern detection flag generated by the third means to generate a special-pattern count number, and resetting the special-pattern count number in response to a sync signal in a first frame in a first sector in a block which is detected by the sync signal detector;

fourth means for changing operation of the sync signal detector from the inertia mode to the direct detection mode at a timing a prescribed time after a moment when the special-pattern count number generated by the counter reaches the natural number "m" or when the sector address signal extracted by the second means denotes a last sector in a block;

fifth means for holding operation of the sync signal detector in the direct detection mode until a sync signal in a first frame in a first sector in a block is detected by the sync signal detector; and sixth means for changing operation of the sync signal detector from the direct detection mode to the inertia mode when a sync signal in a first frame in a first sector in a block is detected by the sync signal detector.

7. A method of detecting sync signals from a recording medium and reproducing information from the recording medium in response to the detected sync signals, the recording medium storing an information signal divided into a plurality of blocks each including "m" sectors, each of the sectors being divided into "n" frames having a length corresponding to a prescribed number of clock periods, "m" and "n" denoting natural numbers equal to or greater than 2, each of the frames including a sync signal having a pattern selected from 10 or less different patterns, each of the blocks including a first special signal in a position before a first sector, each of the blocks including a second special signal in a position after a last sector, the second special signal having a pattern equal to one of the different patterns for the sync signal, each of the sectors including a special pattern signal, the method comprising the steps of:

reading an information signal from a recording medium to generate a reproduced signal;

detecting a sync signal in the reproduced signal in either a direct detection mode of operation or an inertia mode of operation, and detecting the sync signal on a pattern search basis during the direct detection mode of operation, and setting a sync detection window in response to the prescribed number of clock periods and detecting the sync signal in the sync detection window during the inertia mode of operation;

detecting a first special signal in the reproduced signal, and generating a first-special-signal detection flag upon detection of the first special signal;

detecting a special pattern signal in the reproduced signal, and generating a special-pattern detection flag upon detection of the special pattern signal;

detecting a second special signal in the reproduced signal, and generating a second-special-signal detection flag upon detection of the second special signal;

counting the special-pattern detection flag to generate a special-pattern count number, and resetting the special-pattern count number in response to the first-special-signal detection flag;

generating a specified-position detection flag in cases where the second-special-signal detection flag is generated when the special-pattern count number is equal to the natural number "m"; and replacing the inertia mode of operation by the direct detection mode of operation for detection of a sync signal when the specified-position detection flag is generated.

8. A method of detecting sync signals from a recording medium and reproducing information from the recording medium in response to the detected sync signals, the recording medium storing an information signal divided into a plurality of blocks each including "m" sectors, each of the sectors being divided into "n" frames having a length corresponding to a prescribed number of clock periods, "m" and "n" denoting natural numbers equal to or greater than 2, each of the frames including a sync signal having a pattern selected from 10 or less different patterns, each of the blocks including a first special signal in a position before a first sector, each of the blocks including a second special signal in a position after a last sector, the second special signal having a pattern equal to one of the different patterns for the sync signal, the information signal including a sector address signal, the method comprising the steps of:

reading an information signal from a recording medium to generate a reproduced signal;

detecting a sync signal in the reproduced signal in either a direct detection mode of operation or an inertia mode of operation, and detecting the sync signal on a pattern search basis during the direct detection mode of operation, and setting a sync detection window in response to the prescribed number of clock periods and detecting the sync signal in the sync detection window during the inertia mode of operation;

extracting a sector address signal from the reproduced signal;

detecting a first special signal in the reproduced signal, and generating a first-special-signal detection flag upon detection of the first special signal;

detecting a second special signal in the reproduced signal, and generating a second-special-signal detection flag upon detection of the second special signal;

replacing the inertia mode of operation by the direct detection mode of operation for detection of a sync signal in cases where the second-special-signal detection flag is generated when the sector address signal denotes a last sector in a block; and replacing the direct detection mode of operation by the inertia mode of operation for detection of a sync signal when the first-special-signal detection flag is generated.

9. A recording medium storing an information signal divided into a plurality of blocks each including "m" sectors, each of the sectors being divided into "n" frames having a length corresponding to a prescribed number of clock periods, "m" and "n" denoting natural numbers equal to or greater than 2, each of the frames including a sync signal having a pattern selected from 10 or less different patterns, each of the blocks including a first special signal in a position before a first sector, each of the blocks including a second special signal in a position after a last sector, the second special signal having a pattern equal to one of the different patterns for the sync signal, each of the sectors including a special pattern signal.

10. An apparatus for reproducing information from a recording medium, the recording medium storing an information signal divided into a plurality of blocks each including a predetermined number of sectors, each of the sectors being divided into a predetermined number of frames each having a predetermined length, each of the frames including a sync signal, each of the blocks including a first special signal in a position before a first frame in a first sector, each of the blocks including a second special signal in a position after a last frame in a last sector, the apparatus comprising:

first means for reading an information signal from a recording medium to generate a reproduced signal;

second means for detecting a sync signal in the reproduced signal on a pattern search basis during operation in a direct detection mode, and for setting a sync detection window in response to the predetermined length and detecting a sync signal in the reproduced signal in the sync detection window during operation in an inertia mode;

third means for detecting a first special signal in the reproduced signal;

fourth means for detecting a second special signal in the reproduced signal;

fifth means for deciding whether or not the reproduced signal currently corresponds to a last sector in a block;

sixth means for changing operation of the second means from the inertia mode to the direct detection mode in response to the detection of the second special signal by the fourth means in cases where the fifth means decides that the reproduced signal currently corresponds to a last sector in a block; and seventh means for changing operation of the second means from the direct detection mode to the inertia mode in response to the detection of the first special signal by the third means.

* * * * *